(12) United States Patent
He et al.

(10) Patent No.: US 10,595,261 B2
(45) Date of Patent: Mar. 17, 2020

(54) PATH SELECTION METHOD AND DEVICE

(71) Applicant: China Academy of Telecommunications Technology, Beijing (CN)

(72) Inventors: Yuan He, Beijing (CN); Jiamin Liu, Beijing (CN)

( * ) Notice: Subject to any disclaimer, the term of this patent is extended or adjusted under 35 U.S.C. 154(b) by 84 days.

(21) Appl. No.: 15/563,907

(22) PCT Filed: Mar. 7, 2016

(86) PCT No.: PCT/CN2016/075803
§ 371 (c)(1),
(2) Date: Oct. 2, 2017

(87) PCT Pub. No.: WO2016/155472
PCT Pub. Date: Oct. 6, 2016

(65) Prior Publication Data
US 2018/0124677 A1   May 3, 2018

(30) Foreign Application Priority Data
Apr. 3, 2015 (CN) .......................... 2015 1 0158979

(51) Int. Cl.
*H04W 40/12* (2009.01)
*H04W 40/24* (2009.01)
(Continued)

(52) U.S. Cl.
CPC ........... *H04W 40/12* (2013.01); *H04W 40/24* (2013.01); *H04W 40/34* (2013.01);
(Continued)

(58) Field of Classification Search
CPC ............. H04W 72/0433; H04W 28/30; H04W 84/047
See application file for complete search history.

(56) References Cited

U.S. PATENT DOCUMENTS 7,961,603 B2 * 6/2011 Harrabida ............... H04L 45/00
370/228
8,761,073 B2 * 6/2014 Liu ......................... H04B 7/155
370/315
(Continued)

FOREIGN PATENT DOCUMENTS

CN       101932120 A     12/2010
CN       102136994 A      7/2011
(Continued)

OTHER PUBLICATIONS

International Search Report dated May 27, 2016 in the PCT priority application (PCT/CN2016/075803).
(Continued)

*Primary Examiner* — Melanie Jagannathan
(74) *Attorney, Agent, or Firm* — Kilpatrick Townsend & Stockton, LLP

(57) ABSTRACT

The present invention relates to the technical field of communications, and particularly relates to a method for selecting a path and device for addressing a problem in which a backhaul requirement of a small station flexibly deployed in a UDN cannot be satisfied by a method providing a single-hop backhaul path via pre-configuration or an OAM configuration. The path selection method provide in an embodiment of the present application comprises: transmitting, by a first node, a path request message for acquiring a backhaul path from the first node to the target node; and determining, by the first node, at least one backhaul path based on the received path indication message. The embodiment of the present invention enables a flexible and convenient determination of a backhaul path for a plug-and-play access point without needing to configure a single-hop backhaul path for the access point work of a network side. In addition, the embodiment of the present invention can be determine a multi-hop backhaul path for the first node based on actual
(Continued)

requirements, thus improving probability for finding a backhaul path satisfying a backhaul requirement of the first node.

9 Claims, 10 Drawing Sheets

(51) Int. Cl.
    *H04W 40/34*    (2009.01)
    *H04W 72/08*    (2009.01)
    *H04W 24/10*    (2009.01)

(52) U.S. Cl.
    CPC .......... *H04W 72/085* (2013.01); *H04W 24/10* (2013.01); *Y02D 70/126* (2018.01); *Y02D 70/1262* (2018.01); *Y02D 70/1264* (2018.01); *Y02D 70/20* (2018.01); *Y02D 70/34* (2018.01)

(56) References Cited

U.S. PATENT DOCUMENTS

| | | | |
|---|---|---|---|
| 9,344,359 B1* | 5/2016 | Tiruveedhula | H04L 45/50 |
| 2002/0067693 A1* | 6/2002 | Kodialam | H04L 45/12 |
| | | | 370/216 |
| 2009/0010190 A1* | 1/2009 | Gong | H04L 45/26 |
| | | | 370/311 |
| 2010/0054262 A1 | 3/2010 | Bamba | |
| 2011/0299406 A1* | 12/2011 | Vobbilisetty | H04L 43/0811 |
| | | | 370/248 |
| 2012/0042077 A1* | 2/2012 | Ceccarelli | H04L 12/5691 |
| | | | 709/226 |
| 2013/0016605 A1* | 1/2013 | Chen | H04L 45/02 |
| | | | 370/221 |
| 2013/0310052 A1* | 11/2013 | Timus | H04W 72/0433 |
| | | | 455/445 |
| 2014/0369185 A1* | 12/2014 | Chen | H04L 45/50 |
| | | | 370/221 |
| 2017/0318484 A1* | 11/2017 | Lindheimer | H04W 40/02 |

FOREIGN PATENT DOCUMENTS

| | | |
|---|---|---|
| CN | 103477698 A | 12/2013 |
| CN | 103782633 A | 5/2014 |
| CN | 103888981 A | 6/2014 |
| EP | 2340678 A1 | 7/2011 |
| EP | 2495918 A1 | 9/2012 |
| WO | 2014/133426 A1 | 9/2014 |
| WO | 2017140185 A1 | 8/2017 |

OTHER PUBLICATIONS

China Unicom: "Local Traffic Optimization Based on RAN Node Direct Communication", 3GPP Draft; R3-121759 Local Traffic Optimization, 3rd Generation Partnership Project (3GPP), Mobile Competence Centre; Aug. 3, 2012, 4 pages.

* cited by examiner

— PATH SELECTION METHOD AND DEVICE

CROSS REFERENCE TO RELATED APPLICATION

The present application is a US National Stage of International Application No. PCT/CN2016/075803, filed on Mar. 7, 2016, designating the United States, and claiming the priority from Chinese patent application No. 201510158979.X, entitled "Path Selection Method and Device", and filed with the Chinese Patent Office on Apr. 3, 2015, the disclosures of which are hereby incorporated by reference.

TECHNICAL FIELD

The present application relates to the technical field of communications, and particularly to a method and apparatus for selecting a path.

BACKGROUND

In the existing Long Term Evolution-Advanced (LTE-A) system, the Relay technology is introduced and mainly used for increasing the throughput of the cell edge, expanding network coverage, providing group mobility services, etc. A Relay Node (RN) is connected with a donor node in a wireless way, and connected to a core network through the donor node. A wireless link between the RN and the donor node is called a backhaul link, and a wireless link between the donor node and a UE served by the donor node and between the RN and a UE served by the RN is called an access link. In the LTE-A system, the donor node of the RN is a macro eNB (DeNB).

In a backhaul link from the RN to the macro eNB, single hop exists between the RN and the macro eNB, and there are only one macro eNB serving an RN at the same moment. A mode of pre-configuration or Operation Administration and Maintenance (OAM) entity configuration is adopted at the network side to determine a donor node for the RN. In the mode of pre-configuration, information of a cell to which the RN can be accessed is pre-configured by the operator before the RN starts up, and the information is stored in the RN. When the RN is started for cell search, the RN performs the cell selection in a pre-configured set of cells, and selects a cell with the best signal quality as a donor cell. In the mode of OAM configuration, the RN conducting as a user equipment accesses to a selected cell after starting up, and is configured with the information of the donor cell through OAM after being identified as the RN by the network side. After obtaining the information of the donor cell, the RN accesses to the selected donor cell and is provided with a backhaul service by the donor cell.

In future development of the mobile communication system, to better meet the demands of users and increase the capacity and throughput of the network, more access nodes (hereafter called small stations) with low power and small coverage will be introduced, i.e. Ultra-Dense Network (UDN) in the future. In the UDN, the network is flexible, for example, in a distributed network or hybrid network, the deployment of an Access Point (AP) is flexible, and usually plug-and-play, so pre-configuration by an operator cannot be realized; and the number of nodes in the UDN is large, and a list of donor cells which OAM is required to be configured with is very large, which will cause configuration and maintenance to be very difficult. Also, due to the large number of nodes, a single-hop backhaul path cannot support the backhaul requirements of multiple nodes in the UDN.

In conclusion, the method of providing the single-hop backhaul path through pre-configuration or OAM configuration cannot satisfy the backhaul requirements of small stations deployed flexibly in the UDN.

SUMMARY

The embodiments of the present application provide a method and apparatus for selecting a path to solve the problem that the backhaul requirements of small stations deployed flexibly in the UDN cannot be satisfied by the method of providing the single-hop backhaul path through pre-configuration or OAM configuration.

An embodiment of the present application provides a method for selecting a path, which includes:

sending, by a first node, a path request message for acquiring a backhaul path from the first node to a target node; and determining, by the first node, at least one backhaul path based on a received path indication message.

Optionally, the target node is any node having a special microwave backhaul link or a wired backhaul link.

Optionally, the path request message includes the identifier information of the first node; or the path request message includes the identifier information of the first node and one or more kinds of the following information:

frequency and/or bandwidth supported by the first node;

backhaul requirement information of the first node, which includes the requirement information on time delay and/or throughput; and a result of neighbour cell measurement of the first node.

Optionally, sending, by the first node, the path request message for acquiring a backhaul path from the first node to the target node includes:

sending, by the first node, the path request message to at least one adjacent second node.

Optionally, sending, by the first node, the path request message to at least one adjacent second node includes:

after the first node accesses to any adjacent second node, sending, by the first node, the path request message to the second node through a Radio Resource Control, RRC, message; or, sending, by the first node, the path request message to at least one adjacent second node in a form of broadcasting.

Optionally, sending, by the first node, the path request message to at least one adjacent second node includes:

performing, by the first node, neighbour cell measurement, selecting, by the first node, at least one second node based on a result of neighbour cell measurement; and sending, by the first node, the path request message to the selected at least one second node.

Optionally, the path indication message is a path response message; and determining, by the first node, at least one backhaul path based on a received path indication message includes:

selecting, by the first node, at least one backhaul path based on the path response message sent by the target node and/or a node having a backhaul path to the target node, wherein the path response message includes path information of the backhaul path from the first node to the target node.

Optionally, after selecting, by the first node, at least one backhaul path based on the path response message, the method further includes:

sending, by the first node, a path acknowledgment message to a node in the selected backhaul path, and wherein the path acknowledgment message includes path information of the selected backhaul path.

Optionally, selecting, by the first node, at least one backhaul path based on the path response message includes:

selecting, by the first node, a backhaul path based on a hop count of each backhaul path satisfying a backhaul requirement when the first node determines that backhaul paths satisfying the backhaul requirement exist based on the path response message; and/or, selecting multiple backhaul paths based on a degree of backhaul requirement being satisfied by each backhaul path that partially satisfies the backhaul requirement when the first node determines that the backhaul paths partially satisfying the backhaul requirement exist based on the path response message; wherein the backhaul requirement includes a requirement for throughput of the backhaul path.

Optionally, the path indication message is a path acknowledgment message; and determining, by the first node at least one backhaul path based on the received path indication message includes:

receiving, by the first node, the path acknowledgment message sent by a centralized control node, wherein the path acknowledgment message includes path information of the backhaul path selected by the centralized control node.

Optionally, the path information of the backhaul path includes identifier information of each node in the backhaul path, or includes identifier information of each node in the backhaul path and information of the backhaul link at each hop.

Optionally, the method further includes:

resending, by the first node, the path request message if the first node does not receive the path indication message within a preset length of time after the path request message is sent, or path information of the backhaul path indicated in the received path indication message does not satisfy the backhaul requirement of the first node; and/or, resending, by the first node, the path request message if packet loss rate of the first node in the determined backhaul path exceeds a preset threshold.

Another embodiment of the present application provides a method for selecting a path, which includes:

receiving, by a second node, a path request message sent by an adjacent first node for acquiring a backhaul path from the first node to a target node; and judging, by the second node, whether a backhaul service can be provided for the first node by itself based on the path request message.

Optionally, the target node is any node having a special microwave backhaul link or a wired backhaul link.

Optionally, judging, by the second node, whether a backhaul service can be provided for the first node by itself includes:

judging, by the second node, whether a backhaul service can be provided for the first node by itself based on the path request message and one or more kinds of following information:

frequency and/or bandwidth supported by the second node;

information indicating characteristics of an access link of the second node; and information indicating characteristics of a backhaul link of the second node.

if the second node is the target node, or the second node has the backhaul path to the target node, then after determining, by the second node, that the backhaul service can be provided for the first node by itself, the method further includes:

sending, by the second node, a path response message to the first node or a centralized control node; wherein the path response message includes path information of the backhaul path from the first node to the target node.

Optionally, the path information of the backhaul path includes identifier information of each node in the backhaul path; or the path information of the backhaul path includes identifier information of each node in the backhaul path and information of the backhaul link at each hop.

Optionally, if the second node is not the target node, then after determining, by the second node, that the backhaul service can be provided for the first node by itself, the method further includes:

adding, by the second node, identifier information thereof into path information of the path request message, and sending, by the second node, the path request message to at least one adjacent node; or, adding, by the second node, identifier information thereof and information of a backhaul link between the second node and the first node into path information of the path request message, and sending, by the second node, the path request message to at least one adjacent node.

Optionally, the method further includes:

determining, by the second node, that the backhaul service needs to be provided for the first node after receiving the path acknowledgment message from the first node or the centralized control node.

Optionally, after determining, by the second node, that the backhaul service cannot be provided for the first node by itself, the method further includes:

discarding, by the second node, the received path request message.

Another embodiment of the present application provides a method for selecting a path, which includes:

receiving, by a centralized control node, a path response message sent by at least one node, wherein the path response message includes path information of a backhaul path from a first node to a target node;

selecting, by the centralized control node, at least one backhaul path based on the path response message sent by the at least one node; and sending, by the centralized control node, a path acknowledgment message indicating the selected backhaul path to a node in the selected backhaul path.

Optionally, the target node is any node having a special microwave backhaul link or a wired backhaul link.

Optionally, selecting, by the centralized control node, at least one backhaul path based on the path response message sent by the at least one node includes:

selecting, by the centralized control node, the backhaul path based on a hop count of each backhaul path satisfying the backhaul requirement of the first node when the centralized control node determines that backhaul paths satisfying the backhaul requirement of the first node exist based on the path response message sent by the at least one node; and/or, selecting, by the centralized control node, multiple backhaul paths based on a degree of backhaul requirement being satisfied by each backhaul path that partially satisfies the backhaul requirement of the first node when the centralized control node determines that backhaul paths partially satisfying the backhaul requirement of the first node exist based on the path response message sent by the at least one node.

An embodiment of the present application provide an apparatus for selecting a path, which includes:

a sending module, configured to send a path request message to for acquiring a backhaul path from a first node to a target node; and a determining module, configured to determine at least one backhaul path based on a received path indication message.

Another embodiment of the present application provides an apparatus for selecting a path, which includes:

a receiving module, configured to receive a path request message sent by an adjacent first node for acquiring a backhaul path from the first node to a target node; and a judging module, configured to judge whether the second node can provide a backhaul service for the first node based on the path request message.

Another embodiment of the present application provides an apparatus for selecting a path, which includes:

a receiving module, configured to receiving a path response message sent by at least one node, wherein the path response message includes path information of a backhaul path from a first node to a target node;

a selecting module, configured to select at least one backhaul path based on the path response message sent by the at least one node; and a sending module, configured to send a path acknowledgment message indicating the selected backhaul path to a node in the backhaul path selected by the selecting module.

In the embodiments of the present application, the first node can obtain a path indication message fed back from other nodes by sending a path request message for acquiring a backhaul path from the first node to the target node, and determines at least one backhaul path based on the path indication message. By this way, a backhaul path can be flexibly and conveniently determined for a plug-and-play access point without the need of configuring a single-hop backhaul path through pre-configuration or OAM, thereby reducing configuration and maintenance at the network side; in addition, with the embodiments of the present application, a multiple-hop backhaul path can be determined for the first node based on the actual need, thereby enhancing the probability of finding a backhaul path satisfying the backhaul requirement of the first node.

DETAILED DESCRIPTION

In the embodiments of the present application, the first node can obtain the path indication message fed back from other nodes by sending a path request message for acquiring the backhaul path from the first node to the target node, and determines at least one backhaul path based on the path indication message. By this way, a backhaul path can be flexibly and conveniently determined for a plug-and-play access point without the need of configuring a single-hop backhaul path through pre-configuration or OAM, thereby reducing configuration and maintenance at the network side; in addition, with the embodiments of the present application, a multiple-hop backhaul path can be determined for the first node based on the actual need, thereby enhancing the probability of finding a backhaul path satisfying the backhaul requirement of the first node.

The embodiments of the present application are applicable to establishment of a backhaul path under various networks, and especially in distributed network and hybrid network, and have obvious advantages, where in the distributed network, no centralized control node exists, and all base stations coordinate/cooperate through negotiation; in the hybrid network, some base stations are controlled by the centralized control node, and some base stations are not controlled by the centralized control node. The centralized control node is a node in the higher layer, which can control multiple base stations and be responsible for managing resources and controlling coordination/cooperation between the eNBs; the centralized control node can be a logic entity or an independent device, for example, an independent access network node such as Local Gateway (LG) or Local Controller (LC), a core network node or an OAM node; the centralized control node also can be a base station which can be regarded as a super base station due to management of multiple base stations, or can be a baseband pool in a C-RAN architecture, which focuses on processing baseband signals of multiple Remote Radio Heads (RRHs). Each node (a first mode, a second node, etc.) in the embodiments of the present application can be a base station in any form, for example, the base station can be a macro base station, such as an evolved Node B (eNB), Node B (NB), etc.; or can be a small station, such as various Low Power Nodes (LPN): a pico eNB, a Femto eNB, a relay node (RN), etc., for example an Access Point (AP); or can be a RRH; or can be a user equipment with enhanced capability, such as a user equipment with relay capability.

The embodiments of the present application are further detailed below in combination with drawings of the description.

First Embodiment

Figure 1:
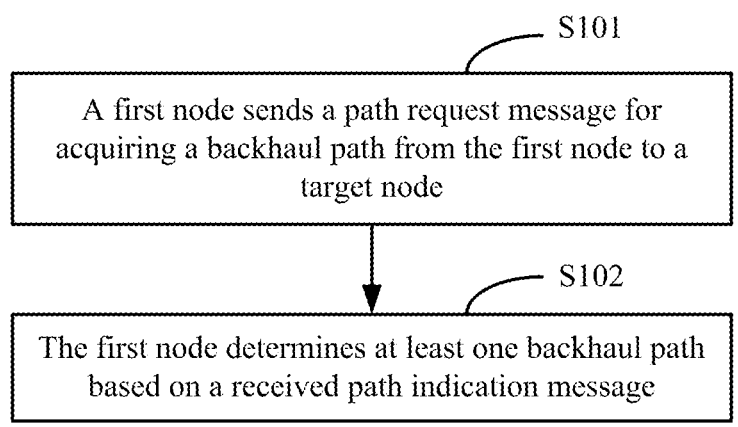
FIG. 1 is flow chart of a method for selecting a path according to a first embodiment of the present application.

As shown in FIG. 1, the flowchart of a method for selecting a path provided in the first embodiment of the present application includes the following operations.

S101: A first node sends a path request message for acquiring a backhaul path from the first node to a target node.

In the embodiment of the present application, the target node is not a node preset by the first node and indicated in the path request message, but any node which can directly communicate with the core network, etc. without needing other nodes to provide a backhaul service for itself. For example, the target node in the embodiment of the present application can be any node (which can be regarded as a node with the backhaul level of 0) having a special microwave backhaul link or a wired backhaul link. After a backhaul path is established between the first node and the target node, the first node can communicate with the core network through the backhaul path. In a concrete implementation, the hop count of the backhaul link through which the data is sent via the node can be indicated by the backhaul level information of the node in a way that the less the hop count is, the lower the level is. The hop count of the backhaul link through which the data is sent via the node is also the number of backhaul links through which the data is transmitted from the node to the node having a wired backhaul link or a special microwave backhaul link. For example, for a macro base station, because each macro base station has a wired backhaul link, the backhaul level of the macro base station is 0; for a small station having a wired backhaul link (different from the macro base station, which is a base station with lower power and small coverage), the backhaul level is 0; for a small station having a special microwave backhaul link, the backhaul level is also 0; for a small station having a wireless backhaul link, the backhaul level is the backhaul level of the node at the previous hop plus 1.

In a concrete implementation, when the first node does not have a backhaul path to the target node, the first node can send a path request message to other nodes to request other nodes to search a backhaul path to the target node for the first node. The nodes receiving the path request message sent by the first node may include the target node, and if a backhaul link can be established between the target node and the first node to form the backhaul path of the first node, the backhaul level of the first node in the backhaul path is 1; the nodes receiving the path request message sent by the first node also may include an intermediate node, and if a backhaul link can be established between the intermediate node and the first node, the intermediate node can continue to search a backhaul path to the target node. After the backhaul path is searched, the backhaul link between the intermediate node and the first node, and the backhaul path from the intermediate node to the target node form the backhaul path of the first node, and the backhaul level of the first node in the backhaul path is the backhaul level of the intermediate node plus 1.

In concrete implementation, the intermediate node can be divided into a first type of intermediate node having a backhaul path to the target node and a second type of intermediate node having no backhaul path to the target node. For the second type of intermediate node, the above mode is required to continue to search a backhaul path to the target node. For the first type of intermediate node, the backhaul path to the target node exists, so the first type of intermediate node can directly feed the existing backhaul path back to the first node or the centralized control node (i.e., sending the path response message to the first node or the centralized control node). Here, the first type intermediate node may only feed the existing backhaul path; may not feed the existing backhaul path, but continue to search a backhaul path to the target node according to the processing mode of the second type of intermediate node; or may also continue to search other backhaul paths to the target node in addition to the existing backhaul path when feeding back the existing backhaul path. Optionally, the first type of intermediate node may determine the processing mode according to the backhaul level thereof in the existing backhaul path. For example, if the first type of intermediate node has high backhaul level (for example, higher than or equal to the preset level of 2) in the existing backhaul path, then the first type of intermediate node searches other backhaul paths to the target node in addition to the existing backhaul path (and may or may not feed back the existing backhaul path); if the first type of intermediate node has low backhaul level (for example, lower than the preset level of 2, and equal to 1) in the existing backhaul path, the first type of intermediate node may directly feed back the existing backhaul path.

S102: The first node determines at least one backhaul path based on a received path indication message.

In a concrete implementation, if other nodes can set up at least one backhaul path to the target node for the first node after the first node sends a path request message, the first node can determine one or more backhaul paths based on the path indication message fed back by another node. The node feeding back the path indication message may be the target node finally searched or the first type of intermediate node having a backhaul path to the target node, or may also be the centralized control node.

If the path indication message indicating the backhaul path is fed back by the target node or the first type of intermediate node, the first node may receive path indication messages (called path response messages in the following second embodiment) fed back by multiple nodes, and the first node can select one backhaul path from backhaul paths respectively indicated by multiple path indication messages. If the path indication message is fed back by the centralized control node, the target node or the first type of intermediate node can indicate the backhaul path from the first node to the target node to the centralized control node, and the centralized control node can select one backhaul path from backhaul paths indicated by multiple nodes and send a path indication message (called a path acknowledgment message in the following third embodiment) indicating the selected backhaul path to the first node, and the first node can directly use the backhaul path selected by the centralized control node. The two implementation modes will be further described in the following embodiments of the present application.

Second Embodiment

In the second embodiment, the implementation mode of sending a path indication message (called a path response message in this embodiment) by the target node or the first type of intermediate node is described in detail.

Figure 2:
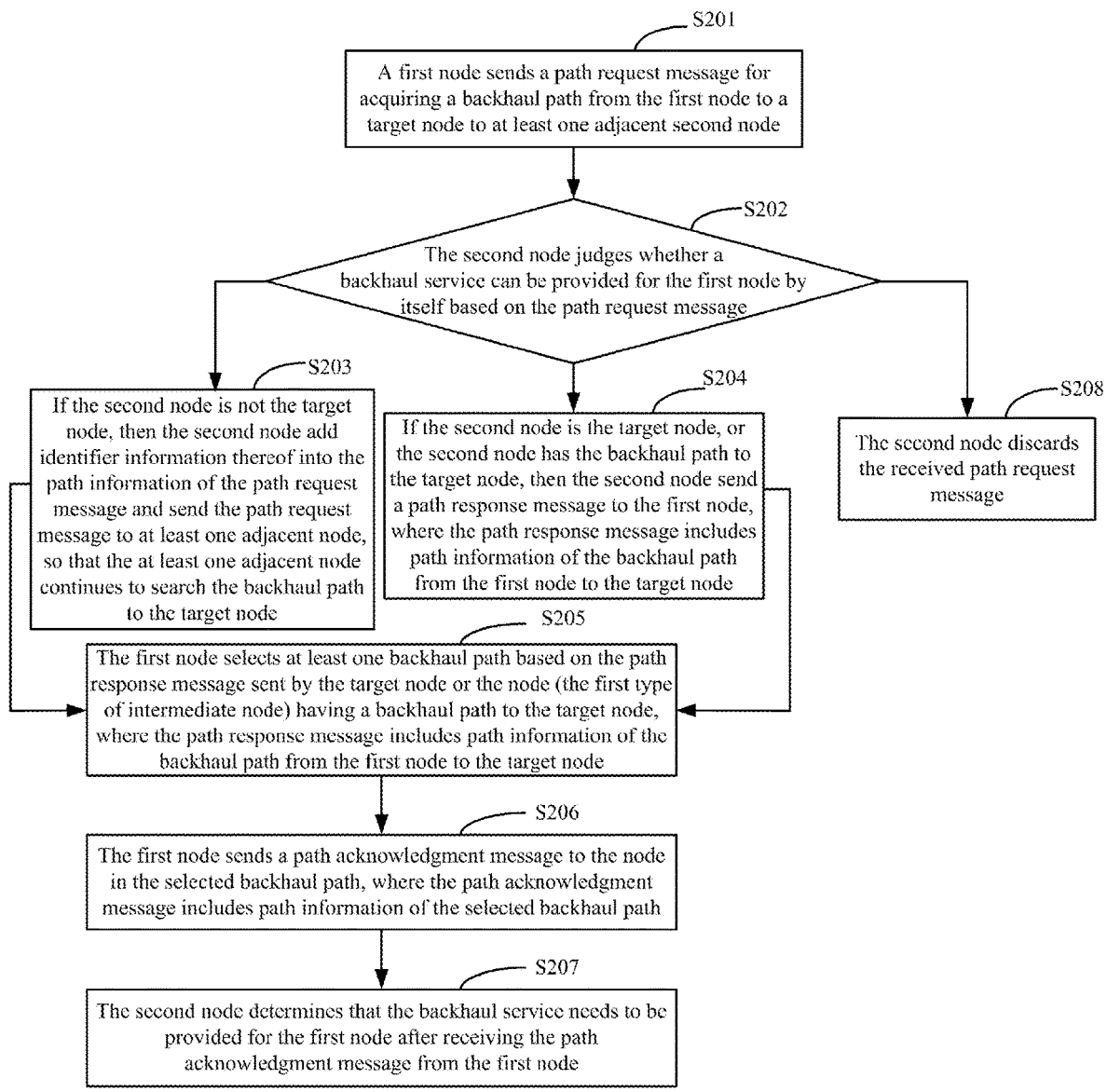
FIG. 2 is flow chart of a method for selecting a path according to a second embodiment of the present application.

As shown in FIG. 2, the flowchart of the method for selecting a path provided in the second embodiment of the present application includes the following operations:

S201: A first node sends a path request message for acquiring a backhaul path from the first node to a target node to at least one adjacent second node.

Optionally, the first node can send a path request message to at least one adjacent second node by one of the following modes.

First mode: After accessing to any adjacent second node, the first node sends the path request message to the second node through a Radio Resource Control (RRC) message.

Second Mode: The first node sends the path request message to at least one adjacent second node in the form of broadcasting.

In a concrete implementation, the first node can access randomly to the adjacent second node as a user equipment, establish a Radio Resource Control (RRC) connection with the second node, and send the path request message to the second node through the RRC message. Or, the first node can broadcast the path request message in a frequency supported by itself; specifically, the first node can broadcast the path request message in multiple frequencies, and also can broadcast the path request message on a dedicated channel; the first node can carry the path request message through a special preamble, specifically by means of scrambling, and the special preamble can be selected at random within a preset scope.

If the above first mode is adopted, the first node performs neighbour cell measurement firstly, selects at least one second node based on the result of neighbour cell measurement, and sends the path request message to at least one selected second node.

In a concrete implementation, the first node may search signals of neighbour cells at frequencies supported by itself after booting up, and measure the neighbour cell where signals are searched, to determine the result of signal measurement of the neighbour cell occupying the frequencies supported by itself. For example, the frequencies supported by the first node include 2.0 GHz, 2.6 GHz and 3.4 GHz-3.6 GHz. The adjacent macro base stations operate at 2.0 GHz, the adjacent small base stations (hereafter called small stations) operate at 3.5 GHz, and the first node measures these macro base stations and small stations to obtain one or more of measurement results of Reference Signal Received Power (RSRP), Reference Signal Received Quality (RSRQ), Signal to Interference plus Noise Ratio (SINR), etc.

In a concrete implementation, the first node sends the path request message to the second node with the best measurement result, for example, the second node with the largest measured RSRP value; or at least one second node with the measured RSRP value larger than the preset RSRP threshold; or all measured second nodes.

If the above second mode is adopted, the first node may not perform neighbour cell measurement, but broadcast the path request message at at least one frequency supported by itself, or the first node may perform neighbour cell measurement and select a frequency at which the path request message is broadcast based on the result of neighbour cell measurement.

S202: The second node, based on the path request message, judges whether a backhaul service can be provided for the first node by itself; if so, performing the operation of S203 or S204; otherwise, performing the operation of S208.

Optionally, the path request message includes identifier information of the first node; or, the path request message includes identifier information of the first node and one or more kinds of the following information: frequency and/or bandwidth supported by the first node; backhaul requirement information of the first node, which includes the requirement information on time delay and/or throughput; and a result of neighbour cell measurement of the first node.

The path request message includes the identifier information of the first node, and the identifier information may be Physical Cell Identifier (PCI), Evolved Universal Terrestrial Radio Access Network (E-UTRAN), E-UTRAN Cell Global Identifier (ECGI), Subscriber Identity Module (SIM) number, Internet Protocol Version 6 (IPv6) address, etc.

In addition to the identifier information, the path request message may further includes one or more kinds of information of frequency and/or bandwidth supported by the first node, the backhaul requirement information of the first node, the results of neighbour cell measurement of the first node, etc. In concrete implementation, the first node may carry the identifier information and backhaul requirement information thereof (such as the requested throughput and time delay of a backhaul link) in the path information of the path request message and send the path request message to other nodes. If the path request message only includes the result of neighbour cell measurement, then the frequency involved in the result of neighbour cell measurement belongs to the frequency supported by the first node.

Optionally, the second node judges whether a backhaul service can be provided for the first node by itself, including: the second node judges whether a backhaul service can be provided for the first node by itself based on the path request message and one or more kinds of the following information: frequency and/or bandwidth supported by the second node; information indicating characteristics of an access link of the second node; and information indicating characteristics of a backhaul link of the second node.

Information indicating the characteristics of an access link of the second node, such as bandwidth, load and other information of the access link of the second node; the backhaul link of the second node, i.e. the backhaul link between the second node and the node at the previous hop, the information indicating the characteristics of the backhaul link of the second node may include time delay, throughput, load and other information of the backhaul link of the second node.

In a concrete implementation, the second node may judge whether a backhaul service can be provided for the first node and whether the backhaul requirement of the first node can be met in view of one or more kinds of information of the frequency and bandwidth supported by the second node, the time delay, throughput and load of the existing backhaul link of the second node, the bandwidth and load of the access link that the second node is responsible for, etc. in combination with the information in the path request message. For example, if the second node can provide the backhaul service for the first node, the second node may meet one or more of the following conditions: there are intersections between the frequencies supported by the second node and the frequencies in the path request message; the existing backhaul link of the second node satisfies the backhaul requirement in the path request message; the frequencies supported by the second node are the frequencies at which better results of neighbour cell measurement of the first node (such as strong signal intensity, good quality and less interference) can be obtained; the access link of the second node has large bandwidth and small load; and the existing backhaul link of the second node has small load.

Optionally, the second node may reserve margin for itself when determining the backhaul requirement which can be met by itself to prevent the influence of service fluctuation. For example, if the throughput requested by the first node is Xbps, and the throughput that the second node can provide is not less than (X+delta1) bps, then the second node confirms that the requirement of the first node for the throughput can be met, where delta1 is the throughput margin reserved for the second node. Similarly, if the time delay that the first node requests to meet is less than Y ms, and the time delay met by the second node is not more than (Y−delta2) ms, then the second node confirms that the requirement of the first node for the time delay can be met, where delta2 is the time delay margin reserved for the second node.

S203: If the second node is not the target node (the intermediate node, which may be the first type of intermediate node or the second type of intermediate node), then the second node will add the identifier information thereof into the path information of the path request message and send the path request message to at least one adjacent node, so that the at least one adjacent node continues to search the backhaul path to the target node.

Here two scenarios exist. In one scenario, the second node is the second type of intermediate node (having no backhaul path to the target node), then the second node will directly perform the above operation S203. In another scenario, the second node is the first type of intermediate node (having the backhaul path to the target node), then the second node will perform the above operation S203 and/or the following operation S204. Optionally, the second node may firstly confirm the backhaul level thereof in the existing backhaul path, and if the backhaul level is higher than or equal to a preset level (for example, the preset level is 2), then the second node may perform only the above operation S203, or perform both the following operation S204 and the above operation S203; if the backhaul level (for example, the backhaul level is 1) is lower than a preset level, then the second node may perform the following operation S204.

Optionally, the path information of the path request message sent by the second node further includes the information of the backhaul link between the second node and the first node.

For example, the path request message sent by the first node only includes frequencies of f1, f2 and f3 supported by the first node; the second node supports the frequencies of f1 and f2, and the access link that the second node is responsible for uses the frequency of f1, and has a bandwidth of 20 MHz and a load of 40%. Therefore, the second node can provide the backhaul service for the first node at the frequencies of f1 and f2. Because f1 is the frequency used by the access link of the second node and has too high load, the second node may select f2 that has low load (not used) as the frequency of the backhaul link between the second node and the first node. Because the second node is the second type of intermediate node, the second node is required to continue to search the backhaul path to the target node. Specifically, the second node may add the identifier information thereof into the path information of the path request message or may also add the information of the backhaul link between the second node and the first node (for example, the backhaul link between the second node and the first node uses the frequency f2) into the path information, and send the path request message carrying the path information and the frequencies supported by the second node to at least one adjacent node, i.e., the path request message sent by the second node includes the frequencies of f1 and f2 supported by the second node and the path information <the identifier information of the first node—the information of the backhaul link between the first node and the second node (the frequency f2 used by the backhaul link)—the identifier information of the second node>.

For example, the path request message sent by the first node includes the frequencies of f1, f2 and f3 supported by the first node, the requested throughput of 60 Mbps and the interference at each frequency indicated by the result of neighbour cell measurement (Specifically, the interference value at any frequency can be the sum of measured RSRP values of adjacent nodes received at that frequency): the interference value at f1 frequency>the interference value at f2 frequency>the interference value at f3 frequency. The second node supports the frequencies of f1 and f2, and has the throughput of the existing backhaul link of 100 Mbps. The access link that the second node is responsible for uses the frequency f1, and has a bandwidth of 20 MHz and a load of 40%. The second node determines that the throughput of the existing backhaul link is 100 Mbps>60 Mbps+delta1 (delta1=10 Mbps), which satisfies the requirement of the first node for the throughput. Because f1 is the frequency used by the access link of the second node and has too high load and strong interference, the second node selects f2 that has low load (not used) to provide the backhaul service for the first node. The second node continues to search the backhaul path to the target node, specifically, the second node may add the identifier information thereof to the path information of the path request message, or may also add the information of the backhaul link between the second node and the first node (for example, the backhaul link between the second node and the first node uses the frequency f2, and satisfies the throughput of 60 Mbps) into the path information, and send the path request message carrying the path information and the frequencies supported by the second node to at least one adjacent node, i.e., the path request message sent by the second node includes the frequencies of f1 and f2 supported by the second node, the throughput of 60 Mbps of the backhaul link requested by the second node, and the path information <the identifier information of the first node (which may further include the throughput of 60 Mbps of the backhaul link requested by the first node)—the information of the backhaul link between the first node and the second node (f2, 60 Mbps)—the identifier information of the second node>.

In concrete implementation, if the second node determines that only part of the throughput requested by the first node can be provided, the sent path request message may further include the information of part of the throughput that the second node can provide.

For example, the path request message sent by the first node includes the frequencies of f1, f2 and f3 supported by the first node, the requested throughput of 60 Mbps and the interference at each frequency indicated by the result of neighbour cell measurement (Specifically, the interference value at any frequency may be the sum of measured RSRP values of adjacent nodes received at that frequency): the interference value at f1 frequency>the interference value at f2 frequency>the interference value at f3 frequency; and the second node supports the frequencies of f1 and f2, and has the throughput of the existing backhaul link of 50 Mbps. The access link that the second node is responsible for uses the f1 frequency, and has a bandwidth of 20 MHz and a load of 40%. The second node determines that the throughput of the existing backhaul link is 50 Mbps<60 Mbps+delta1 (delta1=10 Mbps), which only satisfies part of the requirement of the first node for the throughput; and because f1 is the frequency used by the access link and has too high load and strong interference, f2 that has low load (not used) is used to provide the backhaul service for the first node. The second node is required to continue to search the backhaul path to the target node, specifically, the second node may add the identifier information thereof to the path information of the path request message, or may further add the information of the backhaul link between the second node and the first node (for example, the backhaul link between the second node and the first node uses the frequency f2, and satisfies the throughput of 50 Mbps-delta1=40 Mbps) into the path information, and send the path request message carrying the path information and the frequencies supported by the second node to at least one adjacent node, i.e., the path request message sent by the second node includes the frequencies of f1 and f2 supported by the second node, the throughput of 40 Mbps requested by the second node, and the path information <the identifier information of the first node (which may further include the throughput of 60 Mbps requested by the first node)—the information of the backhaul link between the first node and the second node (f2, 40 Mbps)—the identifier information of the second node>.

S204: If the second node is the target node, or the second node has the backhaul path to the target node (the first type of intermediate node), the second node will send a path response message to the first node, where the path response message includes the path information of the backhaul path from the first node to the target node.

Optionally, the path information of the backhaul path includes the identifier information of each node in the backhaul path, or includes the identifier information of each node in the backhaul path and the information of the backhaul link at each hop.

For example, the second node is the target node which satisfies the backhaul requirement of the first node and can establish a backhaul link with the first node at the frequency f1. The target node may add the identifier information thereof into the path information of the path response message or may further add the information of the backhaul link between the target node and the first node (for example, the backhaul link between the target node and the first node uses the frequency f1) into the path information; and the target node sends the path response message to the first node, and the path response message includes the path information <the identifier information of the first node—the information of the backhaul link between the first node and the target node (for example, the backhaul link between the target node and the first node uses the frequency f1)—the identifier information of the target node>.

In concrete implementation, if the path request message is forwarded to the target node through multiple hops, then the path response message sent by the target node may further include the information of at least one intermediate node, for example, the path response message sent by the target node includes the path information <the identifier information of the first node—the information of the backhaul link between the first node and the intermediate node (such as the frequency f2 used by the backhaul link between the first node and the intermediate node)—the identifier information of the intermediate node—the information of the backhaul link between the intermediate node and the target node (such as the frequency f1 used by the backhaul link between the intermediate node and the target node)—the identifier information of the target node>.

For example, the second node is the first type of intermediate node (having the backhaul path to the target node, which may include a one-hop or multiple-hop backhaul link). Assuming that a backhaul link for direct communication exists between the first type of intermediate node and the target node, the backhaul link uses the frequency f3, which can satisfy the throughput of 100 Mbps in the backhaul requirement. The first type of intermediate node can establish a backhaul link with the first node at the frequency f1, which satisfies the requirement of the first node for the throughput of 60 Mbps. The first type of intermediate node may add the identifier information thereof and the information of the backhaul link between the first type of intermediate node and the target node into the path information of the path response message or may also add the information of the backhaul link between the first type of intermediate node and the first node (for example, the backhaul link between the first type of intermediate node and the first node uses the frequency f1 and satisfies the throughput requirement of 60 Mbps) into the path information; and the first type of intermediate node sends the path response message which includes the path information <the identifier information of the first node—the information of the backhaul link between the first node and the first type of intermediate node (f1, 60 Mbps)—the identifier information of the first type of intermediate node—the information of the backhaul link between the first type of intermediate node and the target node (f3, 100 Mbps)—the identifier information of the target node> to the first node.

In concrete implementation, if the path request message is forwarded to the first type of intermediate node through multiple hops, the path response message sent by the first type of intermediate node may further include the information of at least one second type of intermediate node, for example, the path response message sent by the first type of intermediate node includes the path information <the identifier information of the first node (60 Mbps)+(f2, 60 Mbps)—the identifier information of the second type of intermediate node—(f1, 60 Mbps)—the identifier information of the first type of intermediate node—(f3, 100 Mbps)—the identifier information of the target node>.

S205: The first node selects at least one backhaul path based on a path response message sent by the target node or a node (the first type of intermediate node) having a backhaul path to the target node, where the path response message includes the path information of the backhaul path from the first node to the target node.

Optionally, the first node selects at least one backhaul path based on the path response message, including: selecting the backhaul path based on a hop count of each backhaul path satisfying the backhaul requirement when the first node determines that the backhaul paths satisfying the backhaul requirement exist based on the path response message;

And/or, selecting multiple backhaul paths based on a degree of backhaul requirement being satisfied by each backhaul path that partially satisfies the backhaul requirement when the first node determines that the backhaul paths partially satisfying the backhaul requirement exist based on the path response message, where the backhaul requirement includes the requirement for the throughput of the backhaul path.

In a concrete implementation, the first node has the following principles of backhaul path selection: if multiple backhaul paths satisfying the backhaul requirement exist, one or more backhaul paths will be selected in the order of smallest to largest in hop counts of the backhaul paths. For example, two backhaul paths are selected, one as a main path, and the other as a backup path. When the main path is not available, the backup path will be started quickly so as to enhance the reliability and robustness of the backhaul path. If multiple backhaul paths partially satisfying the backhaul requirement exist, multiple backhaul paths having the fewest paths that satisfy the backhaul requirement will be selected. Multiple backhaul paths can be selected in the order of highest to lowest in degree of satisfying the backhaul requirement (for example, throughput) of each backhaul path.

Optionally, the method further includes: resending, by the first node, the path request message if the first node does not receive the path response message within a preset length of time after the path request message is sent, or the path information of the backhaul path indicated in the received path indication message does not satisfy the backhaul requirement of the first node;

And/or, resending, by the first node, the path request message if packet loss rate of the first node in the selected backhaul path exceeds a preset threshold.

S206: The first node sends a path acknowledgment message to the node in the selected backhaul path, where the path acknowledgment message includes the path information of the selected backhaul path.

S207: The second node determines that the backhaul service needs to be provided for the first node after receiving the path acknowledgment message from the first node.

In a concrete implementation, the second node can be firstly prepared to provide a backhaul service for the first node after determining that the backhaul service is required to be provided for the first node, such as enabling the frequency used by the backhaul link between the second node and the first node (the frequency is not used previously); or reserving resources for the backhaul service (reserving spectrum resources at the frequency and bandwidth previously used).

S208: The second node discards the received path request message.

In a concrete implementation, if the second node determines that the backhaul service cannot be provided for the first node by itself based on the backhaul capability thereof and the path request message of the first node, then the second node may select to discard the received path request message.

For example, the path request message sent by the first node includes the frequencies of f1 and f3 supported by the first node, the requested throughput of 60 Mbps and the interference conditions at each frequency indicated by the result of neighbour cell measurement (Specifically, the interference value at any frequency can be the sum of measured RSRP values of adjacent nodes received at that frequency): the interference value at f1 frequency>the interference value at f3 frequency; and the second node supports the frequencies of f1 and f2, and has the throughput of the existing backhaul link of 50 Mbps. The access link that the second node is responsible for uses the f1 frequency, and has a bandwidth of 20 MHz and a load of 80%. The second node determines that the throughput of the existing backhaul link is 50 Mbps<60 Mbps+delta1 (delta1=10 Mbps), which only satisfies part of the requirement of the first node for the throughput, and the second node can establish a backhaul link with the first node at the frequency f1; however, because f1 is the frequency used by the access link and has too high load and strong interference, the backhaul service cannot be provided for the first node, and therefore the second node selects to discard the received path request message.

A concrete third embodiment will be enumerated to further describe the above second embodiment.

Third Embodiment

Figure 3:
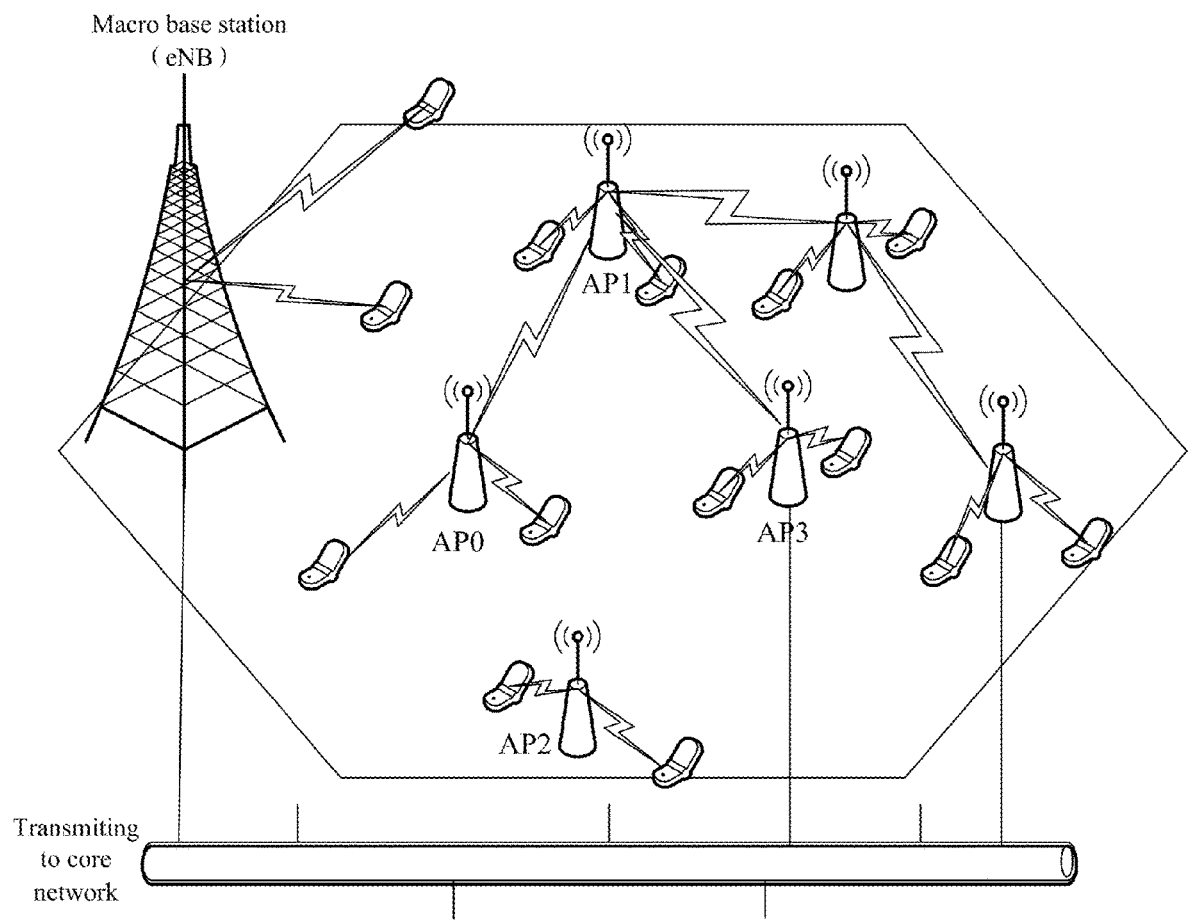
FIG. 3 is flow chart of a method for selecting a path according to a third embodiment of the present application.
Figure 4:
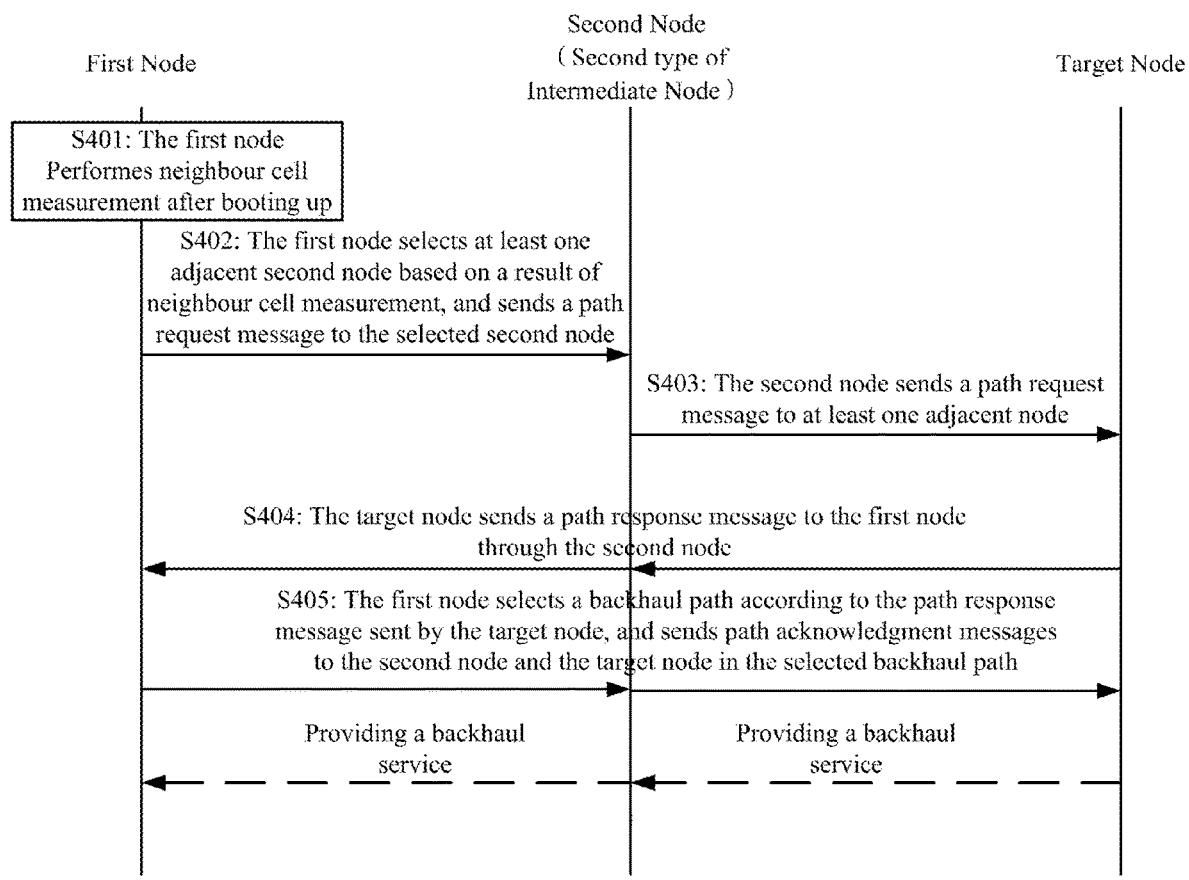
FIG. 4 is a schematic diagram of backhaul path deployment of small stations under distributed network.

FIG. 3 is a schematic diagram of backhaul path deployment of small stations under distributed network, where AP3 is a small station with a wired backhaul link and is connected to the core network through optical fibers, AP0 and AP1 are small stations self-deployed or plug-and-play, and AP1, AP2 and macro eNB is the neighbour cell nodes of AP0. As shown in FIG. 4, the flowchart of a method for selecting a path provided in the third embodiment of the present application, which includes the following operations.

S401: A first node (such as AP0) performs neighbour cell measurement after booting up.

Specifically, the frequencies supported by the AP0 include 2.0 GHz and 3.4 GHz-3.6 GHz. An evolved Node B (eNB) adjacent to AP0 operates at the frequency of 2.0 GHz, and the AP adjacent to AP0 operates at the frequency of 3.5 GHz. AP0 performs the neighbour cell measurement and obtains the measured RSRP values of the adjacent eNB and AP, where the measured RSRP value of eNB is −100 dBm, the measured RSRP value of AP1 is −80 dBm, and the measured RSRP value of AP2 is −110 dBm.

S402: The first node (AP0) selects at least one adjacent second node based on the result of neighbour cell measurement, and sends a path request message to the selected second node.

Specifically, AP0 selects the node with the measured RSRP value less than a preset RSRP threshold (−100 dBm), where the measured RSRP values of both eNB and AP1 satisfy this criterion. AP0 accesses to eNB and AP1 in the form of a user equipment, and sends the path request message through an RRC message, which includes the frequencies of f1, f2 and f3 supported by AP0, the requirement of 60 Mbps for the throughput in the backhaul path, and the interference conditions at each frequency indicated by the result of neighbour cell measurement (Specifically, the interference value at any frequency can be the sum of measured RSRP values of adjacent nodes received at that frequency): the interference value at f1 frequency>the interference value at f2 frequency>the interference value at f3 frequency.

eNB has the backhaul level of 0, supports a frequency of f1, and has the throughput of the existing backhaul link of 1 Gbps. The access link that eNB is responsible for uses the frequency of f1, and has a bandwidth of 20 MHz and a load of 80%. The throughput of the existing backhaul link of eNB is 1 Gbps>60 Mbps+delta1 (delta1=10 Mbps), which can satisfy the backhaul requirement of AP0. The frequency at which eNB can establish the backhaul link for AP0 is f1. However, f1 is the frequency used by the access link of eNB and has too high load and strong interference. Therefore, f1 cannot be used as the frequency of the backhaul link of AP0. eNB discards the path request message.

AP1 has the backhaul level of 2, supports the frequencies of f1 and f2, and has the throughput of the existing backhaul link of 100 Mbps. The access link that AP1 is responsible for uses the frequency of f1, and has a bandwidth of 20 MHz and a load of 40%. The throughput of the existing backhaul link of AP1 is 100 Mbps>60 Mbps+delta1 (delta1=10 Mbps), which can satisfy the backhaul requirement of AP0. The frequencies at which AP1 can provide the backhaul service for AP0 are f1 and f2. Because f1 is the frequency used by the access link of AP1 and has too high load and strong interference, AP1 uses f2 that has low load (not used) and less interference as the frequency of the backhaul link between AP1 and AP0.

AP1 is the first type of intermediate node (having a backhaul path to the target node); however, because AP1 has high backhaul level (the backhaul level is 2) in the existing backhaul path, AP1 selects to continue to search other backhaul paths in addition to the existing backhaul path; and AP1 adds the identifier information thereof, the frequency f2 used by the backhaul link between AP1 and AP0, and the throughput of 60 Mbps of the backhaul requirement met by AP1 to the path information of the path request message.

S403: The second node (AP1, the first type of intermediate node) sends a path request message to at least one adjacent node.

Specifically, the path request message sent by AP1 includes the frequencies of f1 and f2 supported by itself, the requirement of 60 Mbps for the throughput and the existing path information <AP0 (60 Mbps)—(f2, 60 Mbps)—AP1>. The node AP3 adjacent to AP1 receives the path request message.

AP3 has the backhaul level of 0, i.e. AP3 is the target node, supports the frequencies of f1 and f2, and has the throughput of the existing backhaul link of 1 Gbps. The access link that AP3 is responsible for uses the frequency of f2, and has a bandwidth of 20 MHz and a load of 80%. The throughput of the existing backhaul link of AP3 is 1000 Mbps>60 Mbps+delta1 (delta1=10 Mbps), which can satisfy the backhaul requirement of AP1, and the frequencies at which AP3 can provide the backhaul service for AP1 are f1 and f2. Because f2 is the frequency used by the access link of AP3 and has too high load, f1 which has low load (not used) and less interference is used as the frequency of the backhaul link of AP1. AP3 adds the identifier information thereof, the frequency f1 used by the backhaul link between AP3 and AP1, and the throughput of 60 Mbps of the backhaul requirement met by AP3 into the path information. Since AP3 is the target node, AP3 can send the path response message carrying the path information <AP0 (60 Mbps)—(f2, 60 Mbps)—AP1—(f1, 60 Mbps)—AP3> to AP0. Therefore, AP1 has the backhaul level of 1 in the backhaul path fed back by AP3, which is lower than the backhaul level in the existing backhaul path.

S404: The target node (AP3) adjacent to the second node sends the path response message to the first node (AP0) through the second node (AP1).

Specifically, the path response message sent by AP3 includes the path information of the whole backhaul path <AP0 (60 Mbps)—(f2, 60 Mbps)—AP1—(f1, 60 Mbps)—AP3>.

S405: The first node (AP0) selects a backhaul path according to the path response message sent by the target node (AP3), and sends path acknowledgment messages to the second node (AP1) and the target node (AP3) in the selected backhaul path.

Specifically, AP0 receives the path response message from AP3, and selects the backhaul path of <AP0-AP1-AP3> according to the path information. After receiving the path acknowledgment message of AP1, AP1 and AP3 are prepared to provide the backhaul service for AP1; specially, AP1 enables the frequency f2 of the backhaul link between AP1 and AP0, and AP3 enables the frequency f1 of the backhaul link between AP3 and AP1.

Fourth Embodiment

In the fourth embodiment, the detailed description of sending a path indication message (called a path acknowledgment message in this embodiment) by a centralized control node is provided, and the repetitions with the above second embodiment will not be described again.

Figure 5:
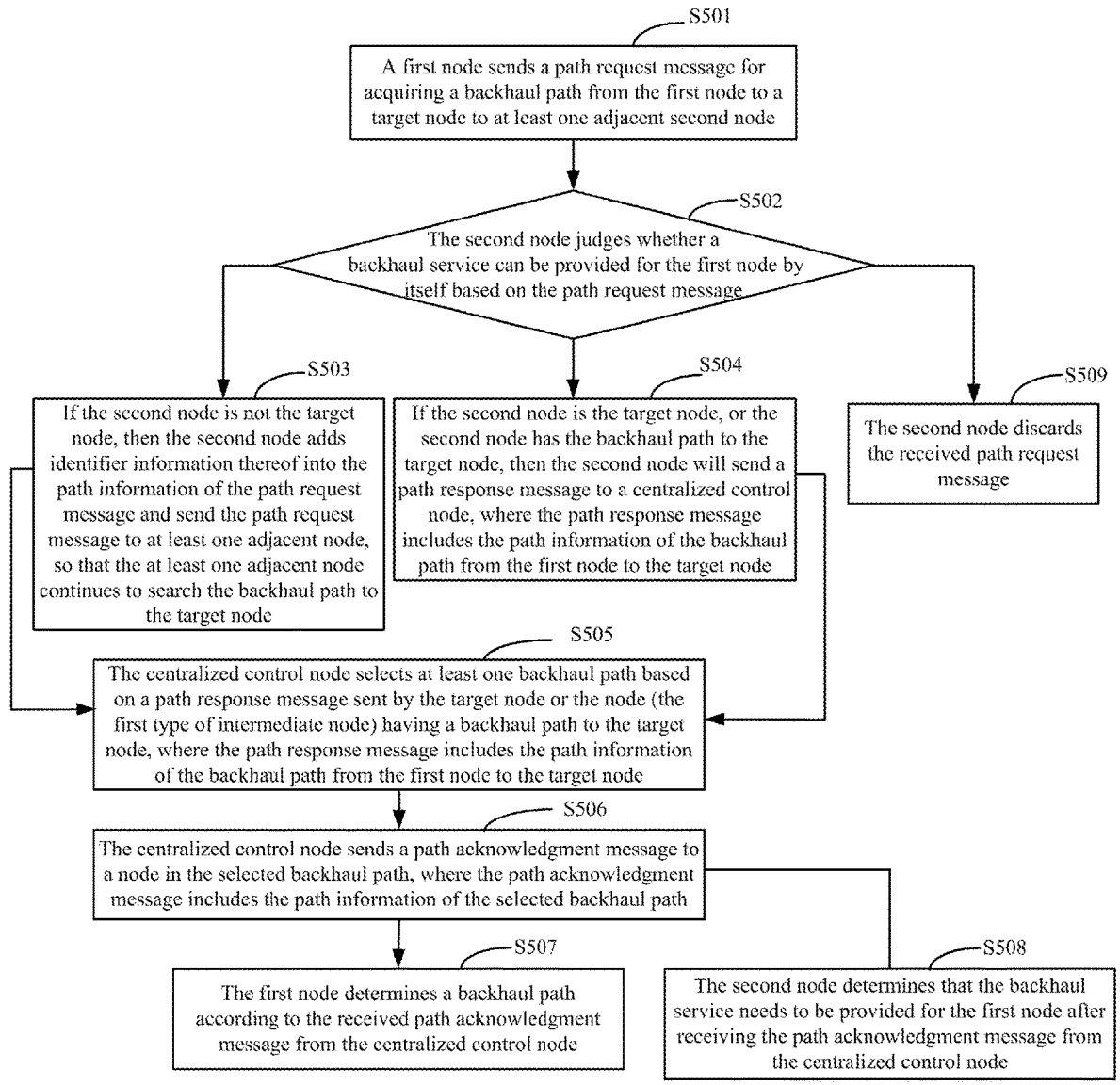
FIG. 5 is flow chart of a method for selecting a path according to a fourth embodiment of the present application.

As shown in FIG. 5, the flowchart of a method for selecting a path is provided in the fourth embodiment of the present application, which includes the following operations.

S501: A first node sends a path request message for acquiring a backhaul path from the first node to a target node to at least one adjacent second node.

S502: The second node judges whether a backhaul service can be provided for the first node by itself based on the path request message; if so, the second performs the operation of S503 or S504; otherwise, the second node performs the operation of S509.

S503: If the second node is not the target node (the intermediate node, which can be the first type of intermediate node or the second type of intermediate node), then the second node will add the identifier information thereof into the path information of the path request message and send the path request message to at least one adjacent node, so that the at least one adjacent node continues to search the backhaul path to the target node.

Here two scenarios exist. In one scenario, the second node is the second type of intermediate node (having no backhaul path to the target node), then the second node will directly perform the above operation S503. In another scenario, the second node is the first type of intermediate node (having the backhaul path to the target node), and the second node will perform the above operation S503 and/or the following operation S504. Optionally, the second node can firstly confirm the backhaul level thereof in the existing backhaul path, and if the backhaul level is higher than or equal to a preset level (for example, the preset level is 2), the second node may perform only the above operation S503, or perform both the following operation S504 and the above operation S503; if the backhaul level (for example, the backhaul level is 1) is lower than a preset level, then the second node may perform the following operation S504.

S504: If the second node is the target node, or the second node has the backhaul path to the target node (the first type of intermediate node), the second node will send a path response message to the centralized control node, where the path response message includes the path information of the backhaul path from the first node to the target node.

Here, if the target node is controlled by the centralized control node, then the second node may send the path response message to the centralized control node.

S505: The centralized control node selects at least one backhaul path based on a path response message sent by the target node or a node having a backhaul path to the target node (the first type of intermediate node), where the path response message includes the path information of the backhaul path from the first node to the target node.

Optionally, the centralized control node selects at least one backhaul path, including: the centralized control node selecting the backhaul path based on the hop count of each backhaul path satisfying the backhaul requirement of the first node when the centralized control node determines that the backhaul paths satisfying the backhaul requirement of the first node exist based on the path response message sent by at least one node;

And/or, the centralized control node selecting multiple backhaul paths based on the degree of backhaul requirement being satisfied by each backhaul path that partially satisfies the backhaul requirement of the first node when the centralized control node determines that the backhaul paths partially satisfying the backhaul requirement of the first node exist based on the path response message sent by at least one node.

In a concrete implementation, the centralized control node has the following principles of backhaul path selection: if multiple backhaul paths satisfying the backhaul requirement exist, one or more backhaul paths will be selected in the order of smallest to largest in hop counts of the backhaul paths. If multiple backhaul paths partially satisfying the backhaul requirement exist, multiple backhaul paths having the fewest paths that satisfy the backhaul requirement will be selected. Multiple backhaul paths can be selected in the order of highest to lowest in degree of satisfying the backhaul requirement (for example, throughput) of each backhaul path.

S506: The centralized control node sends a path acknowledgment message to the node in the selected backhaul path, where the path acknowledgment message includes the path information of the selected backhaul path.

In concrete implementation, the centralized control node can send the path acknowledgment message to the target node, and the target node forwards the path acknowledgment message to the next-hop node in the backhaul path, and the next-hop node further forwards the path acknowledgment message until the message is forwarded to the first node.

S507: The first node determines a backhaul path according to the received path acknowledgment message from the centralized control node.

Optionally, the method further includes: resending, by the first node, the path request message if the first node does not receive the path acknowledgment message within a preset time after the path request message is sent, or the path information of the backhaul path indicated in the received path acknowledgment message does not satisfy the backhaul requirement of the first node;

And/or, resending, by the first node, the path request message if the packet loss rate of the first node in the determined backhaul path exceeds a preset threshold.

S508: The second node determines that the backhaul service needs to be provided for the first node after receiving the path acknowledgment message from the centralized control node.

S509: The second node discards the received path request message.

The present fourth embodiment is different from the second embodiment and third embodiment in that the backhaul path is selected by the centralized control node. Compared to other nodes, the centralized control node stores the node information in a more comprehensive way, and can optimally select the backhaul path globally; and the path response message does not need to be sent to the small station, multi-hop forwarding of the path response message is not needed, thereby reducing the signalling overhead.

A concrete fifth embodiment will be enumerated to further describe the above fourth embodiment.

Fifth Embodiment

Figure 6:
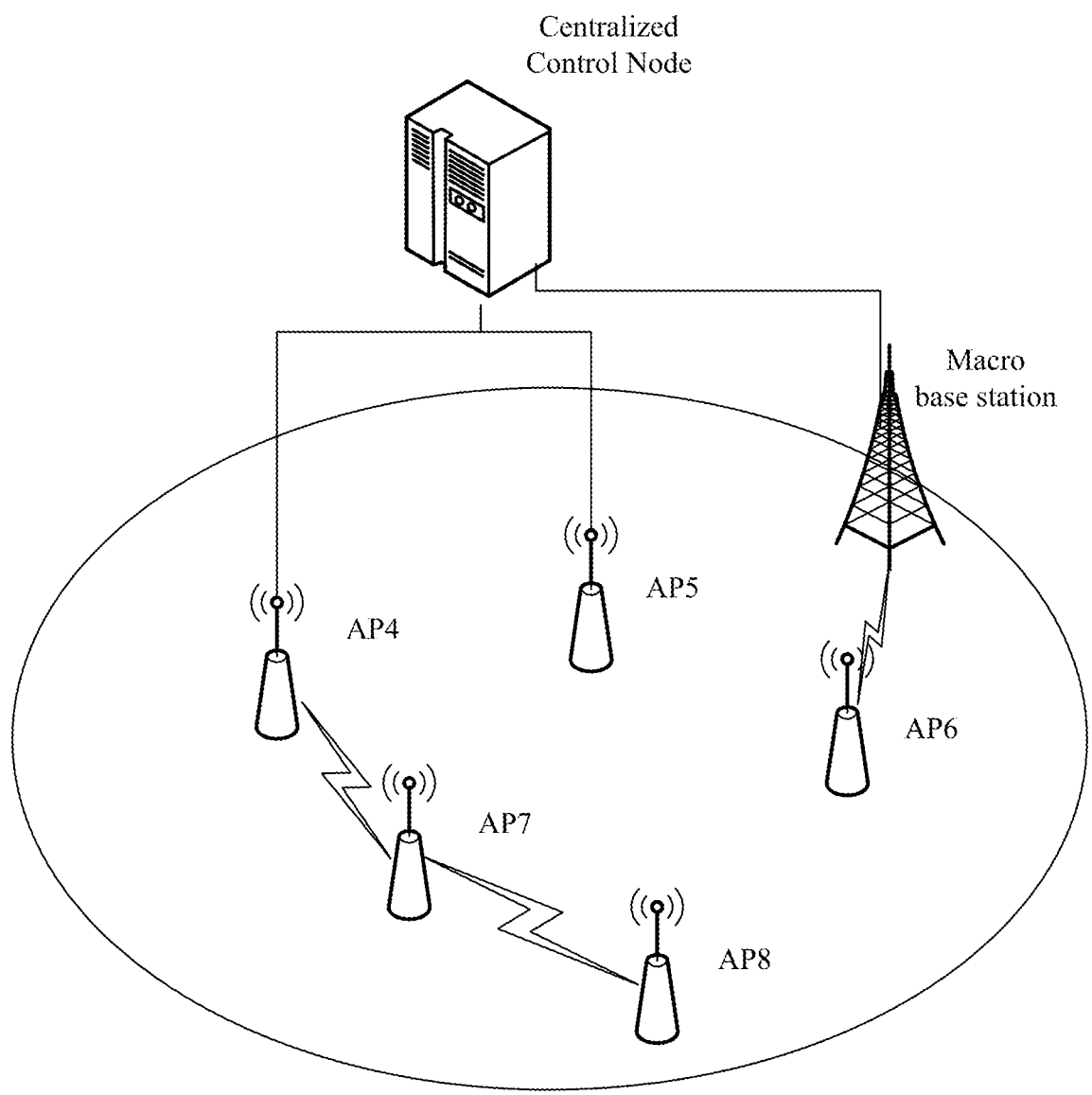
FIG. 6 is flow chart of a method for selecting a path according to a fifth embodiment of the present application.

FIG. 6 is a schematic diagram of backhaul path deployment of small stations under hybrid network. In FIGS. 6, AP4 and AP5 are controlled by the centralized control node, and wired backhaul links exist between AP4 and AP5 and the centralized control node so as to transmit data and signalling. A wired link (such as the link of an X2 interface) exists between a macro eNB and a centralized control node for the interaction of data and signalling. AP6, AP7 and AP8 are plug-and-play APs, and a wireless backhaul link is established between the macro eNB and AP6. The macro eNB provides the backhaul service for AP6 to form a backhaul path of AP6. A wireless backhaul link is established between AP7 and AP4, and AP4 provides the backhaul service for AP7. At the same time, a wireless backhaul link is established between AP7 and AP8, and AP7 provides the backhaul service for AP8. Therefore, the backhaul path of AP8 is AP8-AP7-AP4.

Figure 7:
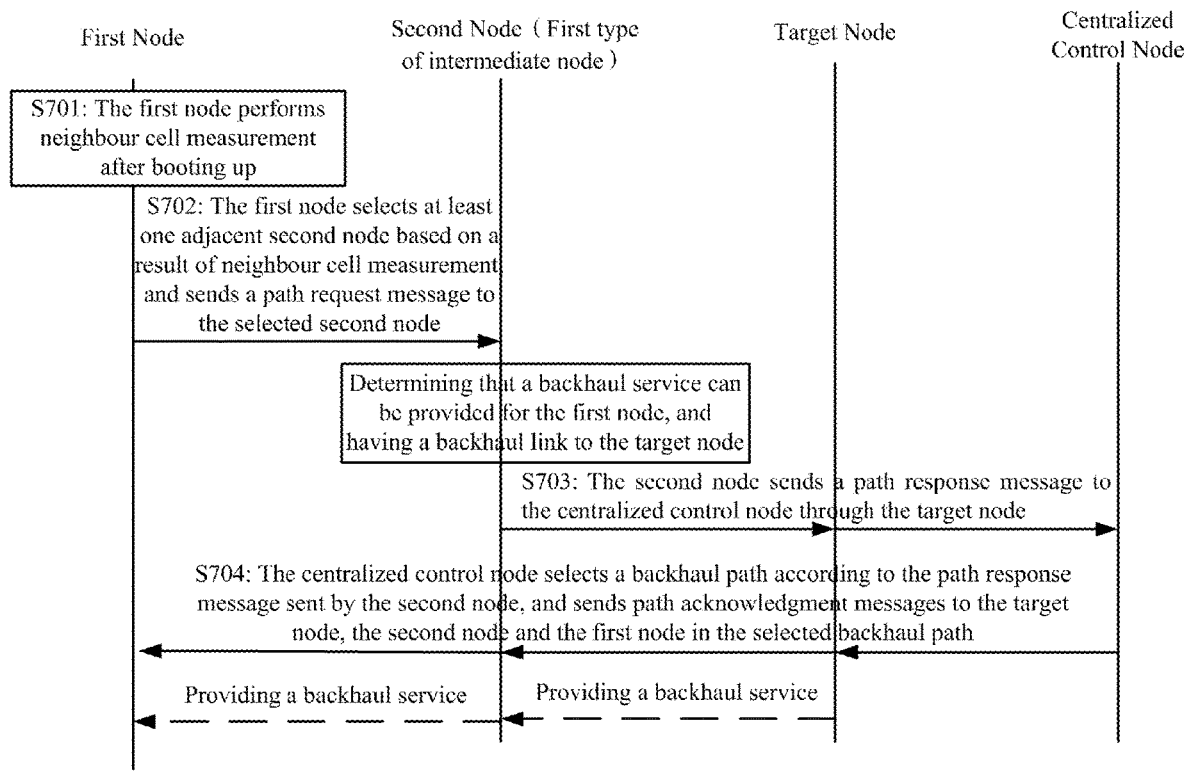
FIG. 7 is a schematic diagram of backhaul path deployment of small stations under hybrid network.

As shown in FIG. 7, the flowchart of a method for selecting a path is provided according to the fifth embodiment of the present application, where the method includes the following operations.

S701: A first node (AP8) performs neighbour cell measurement after booting up.

Specifically, the frequencies supported by the AP8 include 2.0 GHz and 3.4 GHz-3.6 GHz. An evolved Node B (eNB) adjacent to AP8 operates at the frequency of 2.0 GHz, and the AP adjacent to AP8 operates at the frequency of 3.5 GHz. AP8 performs the neighbour cell measurement and obtains the measured RSRP values of the adjacent eNB and AP, where the measured RSRP value of eNB is −100 dBm, the measured RSRP value of AP7 is −80 dBm, and the measured RSRP value of AP6 is −110 dBm.

S702: The first node (AP8) selects at least one adjacent second node based on the result of neighbour cell measurement, and sends a path request message to the selected second node.

Specifically, AP8 selects the node with the measured RSRP value less than a preset RSRP threshold (−100 dBm), where the measured RSRP values of both eNB and AP7 satisfy this criterion. AP8 accesses to eNB and AP7 in the form of a user equipment, and sends the path request message through an RRC message, which includes the frequencies of f1, f2 and f3 supported by AP8, the requirement of 60 Mbps for the throughput in the backhaul path, and the interference conditions at each frequency indicated by the results of neighbour cell measurement (Specifically, the interference value at any frequency can be the sum of measured RSRP values of adjacent nodes received at that frequency): the interference value at f1 frequency>the interference value at f2 frequency>the interference value at f3 frequency.

eNB has the backhaul level of 0, supports a frequency of f1, and has the throughput of the existing backhaul link of 1 Gbps. The access link that eNB is responsible for uses the frequency of f1, and has a bandwidth of 20 MHz and a load of 80%. The throughput of the existing backhaul link of eNB is 1 Gbps>60 Mbps+delta1 (delta1=10 Mbps), which can satisfy the backhaul requirement of AP8. The frequency at which eNB can establish the backhaul link for AP8 is f1. However, f1 is the frequency used by the access link of eNB and has too high load and strong interference. Therefore, f1 cannot be used as the frequency of the backhaul link of AP8. eNB discards the path request message.

AP7 has the backhaul level of 1, supports the frequencies of f1, f2 and f4, and has the throughput of the existing backhaul link of 100 Mbps. The access link that AP7 is responsible for uses the frequency of f1, and has a bandwidth of 20 MHz and a load of 40%. The throughput of the existing backhaul link of AP7 is 100 Mbps>60 Mbps+delta1 (delta1=10 Mbps), which satisfies the backhaul requirement of AP8. The frequency at which AP7 can provide the backhaul service for AP8 are f1 and f2; Because f1 is the frequency used by the access link of AP7 and has too high load and strong interference, AP7 uses f2 that has low load (not used) and less interference as the frequency of the backhaul link between AP7 and AP8.

AP7 determines that a backhaul link to AP4 whose backhaul level is 0 exists (the backhaul link occupies and uses the frequency of f4, and satisfies the throughput requirement of 100 Mbps), and since AP4 is controlled by the centralized control node, AP7 adds the identifier information thereof, the identifier information of AP4, as well as the frequency of f2 used by the backhaul link between AP7 and AP8 and the throughput of 60 Mbps of the backhaul requirement met by the backhaul link between AP7 and AP8 into the path information of a path response message, and then sends the message to the centralized control node through AP4.

S703: The second node (AP7, the first type of intermediate node) sends a path response message to the centralized control node through the target node (AP4).

Specifically, the path response message sent by AP7 includes the path information of the backhaul path <AP8 (60 Mbps)—(f2, 60 Mbps)—AP7—(f4, 100 Mbps)—AP4>.

S704: The centralized control node selects a backhaul path according to the path response message of the second node (AP7), and sends path acknowledgment messages to the target node (AP4), the second node (AP7) and the first node (AP8) in the selected backhaul path.

Specifically, the centralized control node receives the path response message of AP7 forwarded by the target node, and selects the backhaul path of <AP8-AP7-AP4> according to the path information. After AP4 receives the path acknowledgment message, AP4 is prepared to provide the wireless backhaul service for AP7; specifically, AP4 reserves spectrum resources at the used frequency f4. After AP7 receives the path acknowledgment message, AP7 is prepared to provide the wireless backhaul service for AP8; specifically, AP7 enables the frequency f2 of the backhaul link between AP7 and AP8. After AP8 receives the path acknowledgment message, AP8 determines that the backhaul path is <AP8-AP7-AP4>, and the backhaul path satisfies the backhaul requirement of AP8.

Bases on a same inventive concept, the embodiments of the present application further provide an apparatus for selecting a path corresponding to the method for selecting a path. Because the principle of solving the problem used by the device is similar to the method for selecting a path of the embodiments of the present application, the implementation of the device can be referred to that of the method, and the repetitions will not be described again.

Sixth Embodiment

Figure 8:
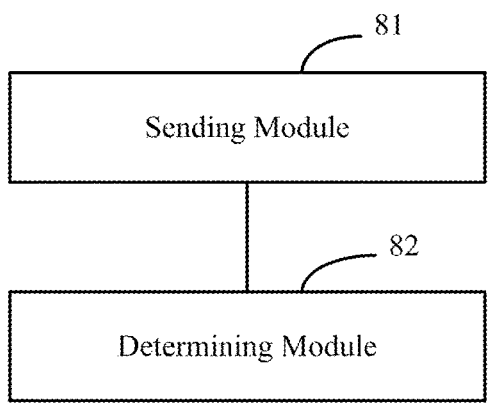
FIG. 8 is a structural schematic diagram of an apparatus for selecting a path according to a sixth embodiment of the present application.

FIG. 8 is a structural schematic diagram of an apparatus for selecting a path according to the sixth embodiment of the present application, where the apparatus includes: a sending module 81, configured to send a path request message for acquiring a backhaul path from a first node to a target node; and a determining module 82, configured to determine at least one backhaul path based on a received path indication message.

Optionally, the target node is any node having a special microwave backhaul link or a wired backhaul link.

Optionally, the path request message includes identifier information of the first node; or, the path request message includes identifier information of the first node and one or more kinds of the following information: frequency and/or bandwidth supported by the first node; backhaul requirement information of the first node, which includes the requirement information on time delay and/or throughput; and a result of neighbour cell measurement of the first node.

Optionally, the sending module 81 is specifically configured to: send the path request message to at least one adjacent second node.

Optionally, the sending module 81 is specifically configured to: send the path request message to the second node through a Radio Resource Control (RRC) message after the first node accesses to any adjacent second node; or, send the path request message to at least one adjacent second node in a form of broadcasting.

Optionally, the sending module 81 is specifically configured to: measuring neighbour cells, selects at least one second node based on a results of neighbour cell measurement; and send a path request message to the selected at least one selected second node.

Optionally, the path indication message is a path response message.

The determining module 82 is specifically configured to: select at least one backhaul path based on the path response message sent by the target node or a node having a backhaul path to the target node, where the path response message includes the path information of the backhaul path from the first node to the target node.

Optionally, the sending module is further configured to send a path acknowledgment message to a node in the selected backhaul path after the determining module 82 selects at least one backhaul path, where the path acknowledgment message includes the path information of the selected backhaul path.

Optionally, the determining module 82 is specifically configured to: select a backhaul path based on a hop count of each backhaul path satisfying the backhaul requirement when determining that backhaul paths satisfying the backhaul requirement exist based on the path response message; and/or, select multiple backhaul paths based on the degree of backhaul requirement being satisfied by each backhaul path that partially satisfies the backhaul requirement when determining that the backhaul path partially satisfying the backhaul requirement exist based on the path response message; where the backhaul requirement includes the requirement for throughput of the backhaul path.

Optionally, the path indication message is a path acknowledgment message.

The determining module 82 is specifically configured to receive the path acknowledgment message sent by a centralized control node; where the path acknowledgment message includes the path information of the backhaul path selected by the centralized control node.

Optionally, the path information of the backhaul path includes identifier information of each node in the backhaul path, or includes identifier information of each node in the backhaul path and information of the backhaul link at each hop.

Optionally, the sending module 81 is further configured to: resend the path request message if the path acknowledgment message is not received within a preset time after the path request message is sent, or path information of the backhaul path indicated in the received path acknowledgment message does not satisfy the backhaul requirement of the first node; and/or, resend the path request message if packet loss rate on the backhaul path determined by the determining module exceeds a preset threshold.

Seventh Embodiment

Figure 9:
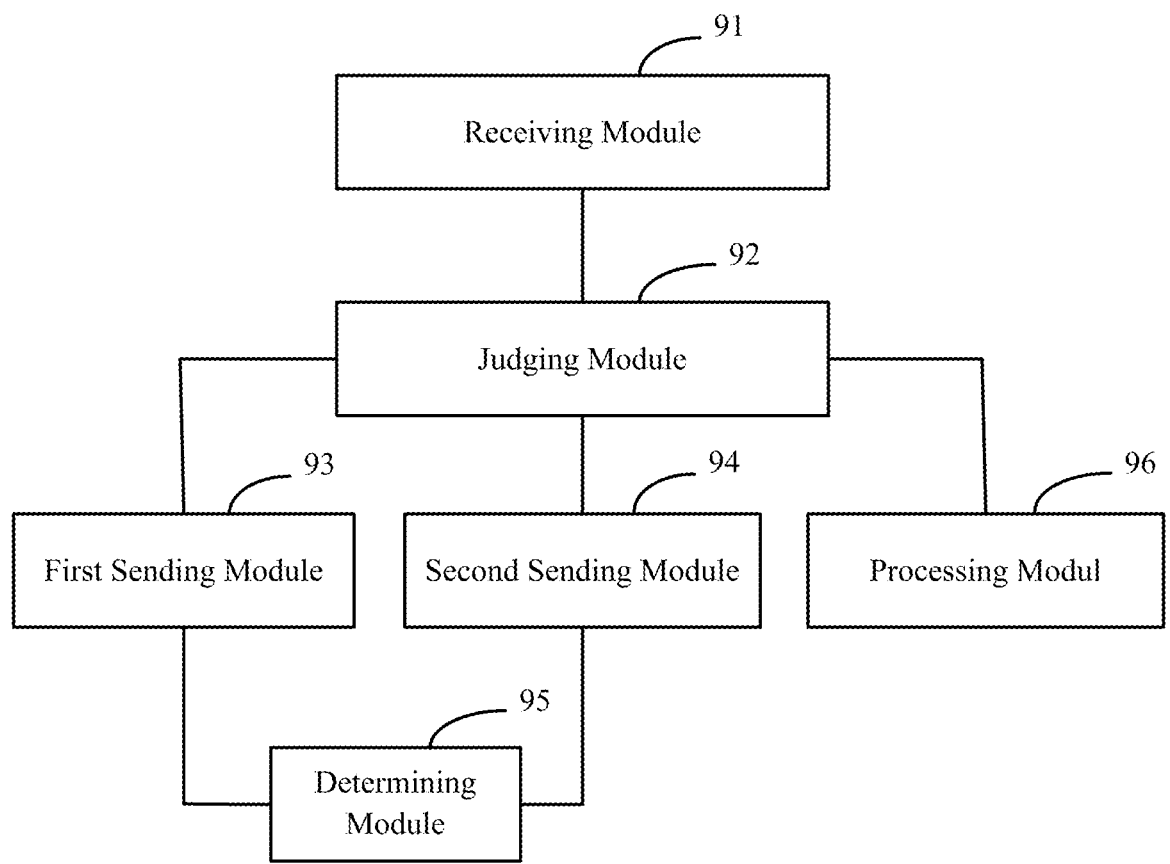
FIG. 9 is a structural schematic diagram of an apparatus for selecting a path according to a seventh embodiment of the present application.

FIG. 9 is a structural schematic diagram of an apparatus for selecting a path according to the seventh embodiment of the present application, where the apparatus includes: a receiving module 91, configured to receive a path request message sent by an adjacent first node for acquiring a backhaul path from the first node to a target node; and a judging module 92, configured to judge whether the second node can provide a backhaul service for the first node based on the path request message.

Optionally, the target node is any node having a special microwave backhaul link or a wired backhaul link.

Optionally, the judging module 92 is specifically configured to: judge whether a backhaul service can be provided for the first node by itself based on the path request message and one or more kinds of the following information: frequency and/or bandwidth supported by the second node; information indicating characteristics of an access link of the second node; information indicating characteristics of a backhaul link of the second node.

Optionally, if the second node is the target node, or the second node has the backhaul path to the target node, the device further includes: a first sending module 93 configured to send a path response message to the first node or a centralized control node after the judging module 92 determines that the second node can provide the backhaul service for the first node; where the path response message includes the path information of the backhaul path from the first node to the target node.

Optionally, the path information of the backhaul path includes identifier information of each node in the backhaul path; or, path information of the backhaul path includes identifier information of each node in the backhaul path and information of the backhaul link at each hop.

Optionally, if the second node is not the target node and the second node does not have the backhaul path to the target node, the device further includes: a second sending module 94, configured to add identifier information of the second node into path information of the path request message, and send the path request message to at least one adjacent node; or add identifier information of the second node and information of a backhaul link between the second node and the first node into path information of the path request message, and send the path request message to at least one adjacent node after the judging module 92 determines that the second node can provide the backhaul service for the first node.

Optionally, the device further includes: a determining module 95, configured to determine that the second node need to provide the backhaul service for the first node after receiving the path acknowledgment message from the first node or the centralized control node.

Optionally, the device further includes: a processing module 96, configured to discard the path request message received by the receiving module after the judging module 92 determines that the second node cannot provide the backhaul service for the first node.

Eighth Embodiment

Figure 10:
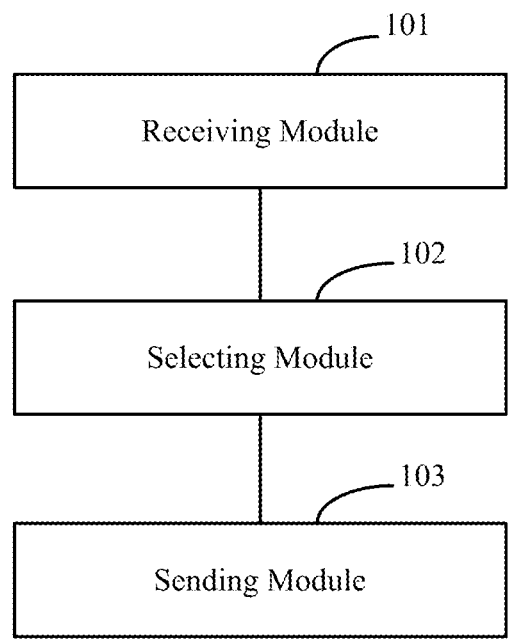
FIG. 10 is a structural schematic diagram of an apparatus for selecting a path according to an eighth embodiment of the present application.

As shown in FIG. 10, the structural schematic diagram of an apparatus for selecting a path is provided according to the eighth embodiment of the present application, where the apparatus includes: a receiving module 101, configured to receive a path response message sent by at least one node; where the path response message includes the path information of a backhaul path from the first node to a target node; a selecting module 102, configured to select at least one backhaul path based on the path response message sent by the at least one node; and a sending module 103, configured to send a path acknowledgment message indicating the selected backhaul path to the node in the backhaul path selected by the selecting module 102.

Optionally, the target node is any node having a special microwave backhaul link or a wired backhaul link.

Optionally, the selecting module 102 is specifically configured to: select the backhaul path based on a hop count of each backhaul path satisfying the backhaul requirement of the first node when determining that backhaul paths satisfying the backhaul requirement of the first node exist based on the path response message sent by the at least one node; and/or, select multiple backhaul paths based on a degree of backhaul requirement being satisfied by each backhaul path that partially satisfies the backhaul requirement of the first node when determining that backhaul paths partially satisfying the backhaul requirement of the first node exists based on the path response message sent by the at least one node.

Ninth Embodiment

Figure 11:
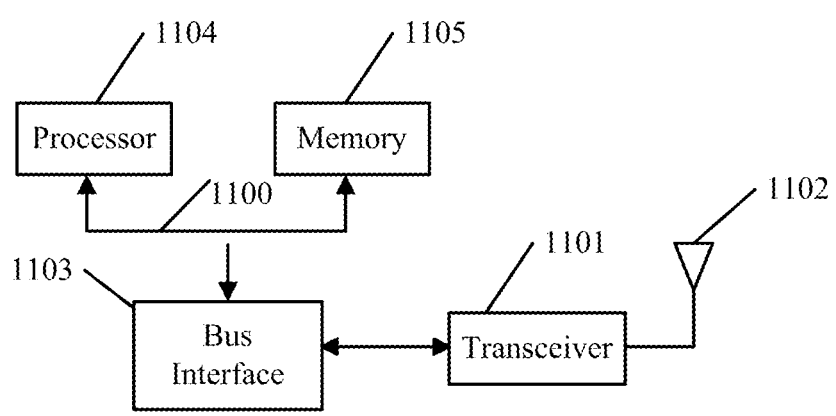
FIG. 11 is a structural schematic diagram of an apparatus for selecting a path according to a ninth embodiment of the present application.

As shown in FIG. 11, the structural schematic diagram of an apparatus for selecting a path is provided according to embodiment of the present application, where the apparatus includes: a processor 1104, configured to read the programs in a memory 1105 and perform the following processes: sending a path request message for acquiring a backhaul path from a first node to a target node through a transceiver 1101; and determining at least one backhaul path based on a received path indication message through the transceiver 1101.

The transceiver 1101, configured to receive and send data under the control of the processor 1104.

Optionally, the target node is any node having a special microwave backhaul link or a wired backhaul link.

Optionally, the path request message includes identifier information of the first node; or, the path request message includes identifier information of the first node and one or more kinds of the following information: frequency and/or bandwidth supported by the first node;

Backhaul requirement information of the first node, which includes the requirement information on time delay and/or throughput; and a result of neighbour cell measurement of the first node.

Optionally, the processor 1104 is specifically configured to: send a path request message to at least one adjacent second node through the transceiver 1101.

Optionally, the processor 1104 is specifically configured to: control the transceiver 1101 to send the path request message to the second node through a Radio Resource Control (RRC) message after the first node accesses to any adjacent second node; or, control the transceiver 1101 to send the path request message to at least one adjacent second node in a form of broadcasting.

Optionally, the processor 1104 is specifically configured to: perform neighbour cell measurement and select at least one second node based on a results of neighbour cell measurement; and send the path request message to the selected at least one second node through the transceiver 1101.

Optionally, the path indication message is a path response message; the processor 1104 is specifically configured to: select at least one backhaul path based on the path response message sent by the target node or a node having a backhaul path to the target node, where the path response message includes the path information of the backhaul path from the first node to the target node.

Optionally, the processor 1104 is further configured to: send a path acknowledgment message to a node in the selected backhaul path through the transceiver 1101 after at least one backhaul path is selected; where the path acknowledgment message includes the path information of the selected backhaul path.

Optionally, the processor 1104 is further configured to: select a backhaul path based on a hop count of each backhaul path satisfying a backhaul requirement when determining that backhaul paths satisfying the backhaul requirement exist based on the path response message; and/or, select multiple backhaul paths based on a degree of backhaul requirement being satisfied by each backhaul path that partially satisfies the backhaul requirement when determining that the backhaul paths partially satisfying the backhaul requirement exist based on the path response message; where the backhaul requirement includes the requirement for throughput of the backhaul path.

Optionally, the path indication message is a path acknowledgment message.

The processor 1104 is specifically configured to: receive the path acknowledgment message sent by a centralized control node through the transceiver 1101; where the path acknowledgment message includes the path information of the backhaul path selected by the centralized control node.

Optionally, the path information of the backhaul path includes identifier information of each node in the backhaul path, or includes identifier information of each node in the backhaul path and information of the backhaul link at each hop.

Optionally, the processor 1104 is further configured to: resend the path request message through the transceiver 1101 if the path indication message is not received within a preset time after the path request message is sent, or path information of the backhaul path indicated in the received path indication message does not satisfy the backhaul requirement of the first node; and/or, resend the path request message through the transceiver 1101 if packet loss rate on the determined backhaul path exceeds a preset threshold.

In FIG. 11, the bus architecture (represented by the bus 1100) may include any number of interconnected buses and bridges, and the bus 1100 links various circuits including one or more processors represented by the processor 1104 and memories represented by the memory 1105. The bus 1100 can further link various other circuits, such as peripheral device, voltage stabilizer and power management circuits, all of which are publicly known of the field, and, therefore, will not be further described. The bus interface 1103 provides an interface between the bus 1100 and the transceiver 1101. The transceiver 1101 can be a component or multiple components, such as multiple receivers and transmitters, which is used to provide a unit communicating with various other devices on the transmission media. The data processed by the processor 1104 is transmitted on the wireless media via the antenna 1102. Further, the antenna 1102 receives data and then transmits the data to the processor 1104.

The processor 1104 is responsible for the management of the bus 1100 and the usual processing, and further provides various functions, including timing, peripheral interface, voltage regulation, power management and other control functions. The memory 1105 can be used to store the data to be used by the processor 1104 during an operation.

Optionally, the processor 1104 can be a central processing unit (CPU), an application specific integrated circuit (ASIC), a field-programmable gate array (FPGA) or a complex programmable logic device (CPLD).

Tenth Embodiment

Figure 12:
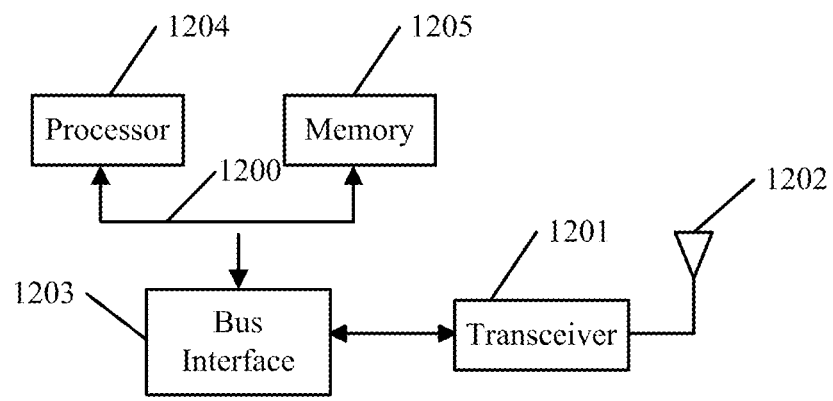
FIG. 12 is a structural schematic diagram of an apparatus for selecting a path according to a tenth embodiment of the present application.

As shown in FIG. 12, the structural schematic diagram of an apparatus for selecting a path is provided according to the tenth embodiment of the present application, where the apparatus includes: a processor 1204, configured to read the programs in a memory 1205 and perform the following processes: receiving a path request message sent by an adjacent first node for acquiring a backhaul path from the first node to a target node through a transceiver 1201; and judging whether the second node can provide the backhaul service for the first node based on the path request message.

The transceiver 1201, configured to receive and send data under the control of a processor 1204.

Optionally, the target node is any node having a special microwave backhaul link or a wired backhaul link.

Optionally, the processor 1204 is specifically configured to: judge whether a backhaul service can be provided for the first node by itself based on the path request message and one or more kinds of the following information: frequency and/or bandwidth supported by the second node; information indicating characteristics of an access link of the second node; and information indicating characteristics of a backhaul link of the second node.

Optionally, if the second node is the target node, or the second node has the backhaul path to the target node, the processor 1204 is further configured to: send a path response message to the first node or a centralized control node through the transceiver 1201 after determining that the second node can provide the backhaul service for the first node; where the path response message includes the path information of the backhaul path from the first node to the target node.

Optionally, the path information of the backhaul path includes identifier information of each node in the backhaul path; or, the path information of the backhaul path includes identifier information of each node in the backhaul path and information of the backhaul link at each hop.

Optionally, if the second node is not the target node and the second node does not have the backhaul path to the target node, the processor 1204 is further configured to: add the identifier information of the second node into the path information of the path request message and send the message to at least one adjacent node through the transceiver 1201 after determining that the second node can provide the backhaul service for the first node; or, add the identifier information of the second node and the information of the backhaul link between the second node and the first node into the path information of the path request message, and send the message to at least one adjacent node through the transceiver 1201.

Optionally, the processor 1204 is further configured to: determine that the second node needs to provide the backhaul service for the first node by the after receiving the path acknowledgment message sent by the first node or the centralized control node through the transceiver 1201.

Optionally, the processor 1204 is further configured to: discard the path request message received by the receiving module after determining that the second node cannot provide the backhaul service for the first node.

In FIG. 12, the bus architecture (represented by the bus 1200) can include any number of interconnected buses and bridges, and the bus 1200 links various circuits including one or more processors represented by the processor 1204 and memories represented by the memory 1205. The bus 1200 can further link various other circuits, such as peripheral, voltage stabilizer and power management circuits, all of which are publicly known of the field, and, therefore, will not be further described. The bus interface 1203 provides an interface between the bus 1200 and the transceiver 1201. The transceiver 1201 can be a component or multiple components, such as multiple receivers and transmitters, which is used to provide a unit communicating with various other devices on the transmission media. The data processed by the processor 1204 is transmitted on the wireless media via the antenna 1202. Further, the antenna 1202 receives data and then transmits the data to the processor 1204.

The processor 1204 is responsible for the management of the bus 1200 and the usual processing, and further provides various functions, including timing, peripheral interface, voltage regulation, power management and other control functions. The memory 1205 can be used to store the data to be used by the processor 1204 during an operation.

Optionally, the processor 1204 can be a central processing unit (CPU), an application specific integrated circuit (ASIC), a field-programmable gate array (FPGA) or a complex programmable logic device (CPLD).

Eleventh Embodiment

Figure 13:
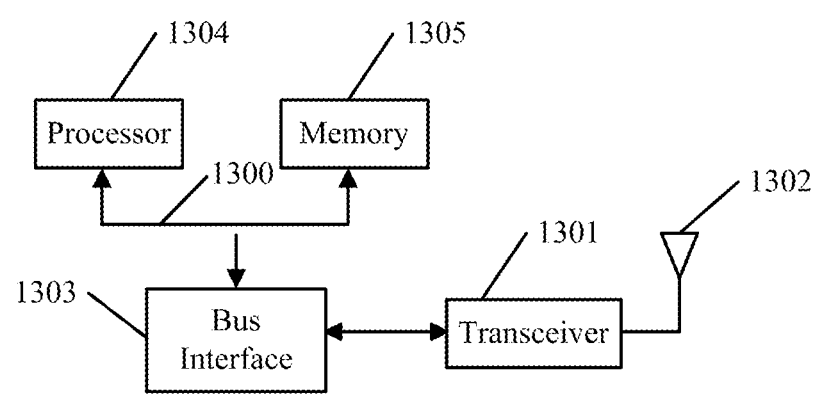
FIG. 13 is a structural schematic diagram of an apparatus for selecting a path according to an eleventh embodiment of the present application.

As shown in FIG. 13, the structural schematic diagram of an apparatus for selecting a path is provided in the eleventh embodiment of the present application, where the apparatus includes: a processor 1304, configured to read programs in a memory 1305 and performing the following processes.

Receiving a path response message sent by at least one node through a transceiver 1301; where the path response message includes path information of a backhaul path from a first node to a target node; selecting at least one backhaul path based on the path response message sent by the at least one node; and sending a path acknowledgment message indicating the selected backhaul path to a node in the selected backhaul path through the transceiver 1301.

The transceiver 1301 is configured to receive and send data under the control of a processor 1304.

Optionally, the target node is any node having a special microwave backhaul link or a wired backhaul link.

Optionally, the processor 1304 is specifically configured to: select the backhaul path based on a hop count of each backhaul path satisfying the backhaul requirement of the first node when determining that backhaul paths satisfying the backhaul requirement of the first node exist based on the path response message sent by the at least one node; and/or, select multiple backhaul paths based on the degree of backhaul requirement being satisfied by each backhaul path that partially satisfies the backhaul requirement of the first node when determining that backhaul paths partially satisfying the backhaul requirement of the first node exist based on the path response message sent by at least one node.

In FIG. 13, the bus architecture (represented by the bus 1300) can include any number of interconnected buses and bridges, and the bus 1300 links various circuits including one or more processors represented by the processor 1304 and memories represented by the memory 1305. The bus 1300 can further link various other circuits, such as peripheral, voltage stabilizer and power management circuits, all of which are publicly known of the field, and, therefore, will not be further described. The bus interface 1303 provides an interface between the bus 1300 and the transceiver 1301. The transceiver 1301 can be a component or multiple components, such as multiple receivers and transmitters, which is used to provide a unit communicating with various other devices on the transmission media. The data processed by the processor 1304 is transmitted on the wireless media via the antenna 1302. Further, the antenna 1302 receives data and then transmits the data to the processor 1304.

The processor 1304 is responsible for the management of the bus 1300 and the usual processing, and further provides various functions, including timing, peripheral interface, voltage regulation, power management and other control functions. The memory 1305 can be used to store the data to be used by the processor 1304 during an operation.

Optionally, the processor 1304 can be a central processing unit (CPU), an application specific integrated circuit (ASIC), a field-programmable gate array (FPGA) or a complex programmable logic device (CPLD).

Obviously, those skilled in the art could implement various modifications to and variations of the present application without departing from the spirit and scope of the present application. So, the present application is intended to include the modifications and variations if the modifications and variations belong to claims of the present application and the equivalent technical scope.

The invention claimed is:

1. A method for selecting a path, comprising:
    sending, by a first node, to at least one adjacent second node a path request message for acquiring a backhaul path from the first node to a target node; wherein the target node is not a node preset by the first node or indicated in the path request message, but any node which can directly communicate with a network without needing other nodes to provide a backhau 1 service for itself; and
    selecting, by the first node, at least one backhaul path based on a received path response message sent by the target node and/or a node having a backhaul path to the target node, wherein the path response message comprises path information of the at least one backhaul path;
    wherein sending, by the first node, to the at least one adjacent second node the path request message comprises:
    after the first node accesses to any adjacent second node, sending, by the first node, the path request message to the adjacent second node through a Radio Resource Control, RRC, message; or,
    sending, by the first node, the path request message to the at least one adjacent second node in a form of broadcasting.

2. The method of claim 1, wherein the path request message comprises identifier information of the first node; or the path request message comprises identifier information of the first node and one or more kinds of following information:
    frequency and/or bandwidth supported by the first node;
    backhaul requirement information of the first node, which comprises requirement information on time delay and/or throughput; or
    a result of neighbour cell measurement of the first node.

3. The method of claim 1, wherein sending, by the first node, to the at least one adjacent second node the path request message comprises:
    performing, by the first node, neighbour cell measurement; selecting, by the first node, the at least one adjacent second node based on a result of neighbour cell measurement; and
    sending, by the first node, the path request message to the selected at least one adjacent second node.

4. The method of claim 1, wherein after selecting, by the first node, the at least one backhaul path based on the received path response message, the method further comprises:
    sending, by the first node, a path acknowledgment message to a node in a selected backhaul path, wherein the path acknowledgment message comprises path information of the selected backhaul path.

5. The method of claim 1, wherein selecting, by the first node, the at least one backhaul path based on the received path response message comprises:
    selecting, by the first node, a backhaul path based on a hop count of each of backhaul paths satisfying a backhaul requirement when the first node determines that the backhaul paths satisfying the backhaul requirement exist based on the path response message; and/or, selecting, by the first node, multiple backhaul paths based on a degree of backhaul requirement being satisfied by each of backhaul paths partially satisfying a backhaul requirement when the first node determines that the backhaul paths partially satisfying the backhaul requirement exist based on the path response message; wherein the backhaul requirement comprises a requirement for throughput of the backhaul path.

6. The method of claim 1, wherein path information of a backhaul path comprises identifier information of each node in the backhaul path, or comprises identifier information of each node in the backhaul path and information of a backhaul link at each hop.

7. The method of claim 1, wherein the method further comprises:
    resending, by the first node, the path request message if the first node does not receive the path response message within a preset length of time after the path request message is sent, or the path information of the at least one backhaul path indicated in the received path response message does not satisfy a backhaul requirement of the first node; and/or,
    resending, by the first node, the path request message if packet loss rate of the first node in the selected at least one backhaul path exceeds a preset threshold.

8. An apparatus for selecting a path, comprising a memory, a transceiver and at least one processor;
    wherein the memory is configured to store computer programs, the transceiver is configured to receive and send data under control of the at least one processor, and the at least one processor is configured to read the computer programs in the memory to:
    send to at least one adjacent second node a path request message for acquiring a backhaul path from a first node to a target node through the transceiver; wherein the target node is not a node preset by the first node or indicated in the path request message, but any node which can directly communicate with a network without needing other nodes to provide a backhaul service for itself; and
    selected at least one backhaul path based on a received path response message sent by the target node and/or a node having a backhaul path to the target node, wherein the path response message comprises path information of the at least one backhaul path;
    wherein the at least one processor is further configured to read the computer programs in the memory to:
    after the first node accesses to any adjacent second node, send the path request message to the adjacent second node through a Radio Resource Control, RRC, message; or,
    send the path request message to the at least one adjacent second node in a form of broadcasting.

9. The apparatus of claim 8, wherein the at least one processor is further configured to read the computer programs in the memory to:
    select a backhaul path based on a hop count of each of backhaul paths satisfying a backhaul requirement when determining that the backhaul paths satisfying the backhaul requirement exist based on the path response message; and/or,
    select multiple backhaul paths based on a degree of backhaul requirement being satisfied by each of backhaul paths partially satisfying a backhaul requirement when determining that the backhaul paths partially satisfying the backhaul requirement exist based on the path response message; wherein the backhaul requirement comprises the requirement for throughput of the backhaul path.

\* \* \* \* \*